(12) United States Patent
Oka et al.

(10) Patent No.: US 12,130,911 B2
(45) Date of Patent: Oct. 29, 2024

(54) CONTROLLER SYSTEM

(71) Applicant: OMRON Corporation, Kyoto (JP)

(72) Inventors: Minoru Oka, Moriyama (JP);
Masayuki Yamamoto, Suita (JP);
Satoshi Kojima, Tokyo (JP); Tsuyoshi Okumura, Yokohama (JP); Yasuo Muneta, Kusatsu (JP); Yutaka Tahara, Ritto (JP); Kotaro Okamura, Kusatsu (JP); Yuta Nagata, Kusatsu (JP)

(73) Assignee: OMRON Corporation, Kyoto (JP)

( * ) Notice: Subject to any disclaimer, the term of this patent is extended or adjusted under 35 U.S.C. 154(b) by 504 days.

(21) Appl. No.: 17/284,784

(22) PCT Filed: Nov. 21, 2019

(86) PCT No.: PCT/JP2019/045550
§ 371 (c)(1),
(2) Date: Apr. 12, 2021

(87) PCT Pub. No.: WO2020/110876
PCT Pub. Date: Jun. 4, 2020

(65) Prior Publication Data
US 2021/0406367 A1    Dec. 30, 2021

(30) Foreign Application Priority Data

Nov. 28, 2018   (JP) ................... 2018-222649
Jun. 20, 2019   (JP) ................... 2019-114336

(51) Int. Cl.
*G06F 21/55*    (2013.01)
*G05B 19/05*    (2006.01)
*G06F 21/57*    (2013.01)

(52) U.S. Cl.
CPC ......... *G06F 21/554* (2013.01); *G05B 19/058* (2013.01); *G06F 21/57* (2013.01);
(Continued)

(58) Field of Classification Search
CPC .. G06F 21/554; G06F 21/57; G06F 2221/034; G05B 19/058; G05B 2219/14006
See application file for complete search history.

(56) References Cited

U.S. PATENT DOCUMENTS 10,205,733 B1 *   2/2019   Park ..................... H04L 63/18
10,671,060 B2 *   6/2020   Abbaszadeh ....... H04L 63/1408
(Continued)

FOREIGN PATENT DOCUMENTS

CN     107918590     4/2018
JP     2000137506     5/2000
(Continued)

OTHER PUBLICATIONS

"Search Report of Europe Counterpart Application", issued on Oct. 13, 2022, pp. 1-17.
(Continued)

*Primary Examiner* — Charles R Kasenge
(74) *Attorney, Agent, or Firm* — JCIPRNET

(57) ABSTRACT

The present invention addresses the novel problem of protecting against threats that can arise as a result of the development of networked or intelligent control devices and control systems. This controller system includes: a control unit that executes a control operation for controlling a control target; and a security unit that is connected to the control unit and oversees and manages security functions for the controller system. The security unit includes a detection means that detects whether any unauthorized intrusion into the controller system has occurred. The control unit includes a command transmission means that transmits commands for changing the behavior of the detection means of the security unit.

15 Claims, 27 Drawing Sheets

(52) U.S. Cl.
CPC .............. *G05B 2219/14006* (2013.01); *G06F 2221/034* (2013.01)

(56) References Cited

U.S. PATENT DOCUMENTS

| | | | |
|---|---|---|---|
| 10,848,397 B1 * | 11/2020 | Siddiqui | ............... H04L 67/025 |
| 2015/0295944 A1 | 10/2015 | Yunoki et al. | |
| 2020/0051434 A1 * | 2/2020 | Sasaki | ................ H04L 12/4625 |

FOREIGN PATENT DOCUMENTS

| | | |
|---|---|---|
| JP | 2002328706 | 11/2002 |
| JP | 2005107726 | 4/2005 |
| JP | 2011192105 | 9/2011 |
| JP | 2014099014 | 5/2014 |
| JP | 2014157483 | 8/2014 |
| JP | 2014197346 | 10/2014 |
| JP | 2014203116 | 10/2014 |
| JP | 2015176369 | 10/2015 |
| JP | 2015200971 | 11/2015 |
| JP | 2016081270 | 5/2016 |
| JP | 2017073765 | 4/2017 |
| JP | 2017103677 | 6/2017 |
| JP | 2017111540 | 6/2017 |
| JP | 2017129894 | 7/2017 |
| JP | 2018152484 | 9/2018 |
| WO | 2015001594 | 1/2015 |
| WO | 2018048351 | 3/2018 |

OTHER PUBLICATIONS

"Office Action of Japan Counterpart Application" with English translation thereof, issued on Sep. 7, 2021, p. 1- p. 12.

"International Search Report (Form PCT/ISA/210) of PCT/JP2019/045550," mailed on Jan. 21, 2020, with English translation thereof, pp. 1-4.

"Written Opinion of the International Searching Authority (Form PCT/ISA/237) of PCT/JP2019/045550," mailed on Jan. 21, 2020, with English translation thereof, pp. 1-8.

"Search Report of Europe Counterpart Application", issued on Jul. 12, 2022, p. 1-p. 15.

"Notice of Reasons for Refusal of Japan Counterpart Application", issued on Dec. 5, 2023, with English translation thereof, pp. 1-8.

"Office Action of China Counterpart Application", issued on Dec. 6, 2023, with English translation thereof, pp. 1-14.

* cited by examiner

| Incident characteristic | Facility A | Facility B | Facility C |
|---|---|---|---|
| No (normal operation) | Facility control:normal operation Information communication: normal operation | Facility control:normal operation Information communication: normal operation | Facility control:normal operation Information communication: normal operation |
| Random alteration | Facility control:normal operation Information communication: degeneration A1 | Facility control:normal operation Information communication: normal operation | Facility control: degeneration C1 Information communication: degeneration C2 |
| Resource exhaustion | Facility control: degeneration A2 Information communication: degeneration A3 | Facility control: degeneration B1 Information communication: degeneration B2 | Facility control: stoppage Information communication: degeneration C3 |
| DDoS attack | Facility control: stoppage Information communication: degeneration A4 | Facility control:normal operation Information communication: degeneration B3 | Facility control: stoppage Information communication: degeneration C4 |
| ... | | | |

FIG. 9

| Incident characteristic | Facility A | Facility B | Facility C |
|---|---|---|---|
| No (normal operation) | Facility control:normal operation<br>Information communication: normal operation | Facility control:normal operation<br>Information communication: normal operation | Facility control:normal operation<br>Information communication: normal operation |
| Level 1 | Facility control:normal operation<br>Information communication: degeneration A1 | Facility control:normal operation<br>Information communication: normal operation | Facility control:normal operation<br>Information communication: degeneration C1 |
| Level 2 | Facility control: degeneration A2<br>Information communication: degeneration A3 | Facility control: degeneration B1<br>Information communication: degeneration B2 | Facility control:normal operation<br>Information communication: degeneration C2 |
| Level 3 | Facility control: stoppage<br>Information communication: degeneration A4 | Facility control: stoppage<br>Information communication: degeneration B3 | Facility control: degeneration C3<br>Information communication: degeneration C4 |

FIG. 10

| Incident characteristic | Facility A (Operation) | Facility B | Facility C |
|---|---|---|---|
| No (normal operation) | Facility control: normal operation<br>Information communication: normal operation | | |
| Random alteration | Facility control: normal operation<br>Information communication: degeneration A1 | | |
| Resource exhaustion | Facility control: degeneration A2<br>Information communication: degeneration A3 | | |
| DDoS attack | Facility control: degeneration A4<br>Information communication: degeneration A5 | | |
| ... | | | |

| Incident characteristic | Facility A (Maintenance) | Facility B | Facility C |
|---|---|---|---|
| No (normal operation) | Facility control: normal operation<br>Information communication: normal operation | | |
| Random alteration | Facility control: normal operation<br>Information communication: normal operation | | |
| Resource exhaustion | Facility control: normal operation<br>Information communication: degeneration A7 | | |
| DDoS attack | Facility control: degeneration A8<br>Information communication: degeneration A9 | | |

| Incident characteristic | Facility A (Setup change) | Facility B | Facility C |
|---|---|---|---|
| No (normal operation) | Facility control: normal operation<br>Information communication: normal operation | | |
| Random alteration | Facility control: normal operation<br>Information communication: degeneration A1 | | |
| Resource exhaustion | Facility control: degeneration A2<br>Information communication: degeneration A3 | | |
| DDoS attack | Facility control: degeneration A4<br>Information communication: degeneration A10 | | |

| Incident characteristic | Type I | Type II | Type III |
|---|---|---|---|
| No (normal operation) | Facility control:normal operation<br>Information communication: normal operation | Facility control:normal operation<br>Information communication: normal operation | Facility control:normal operation<br>Information communication: normal operation |
| Level 1 | Facility control:normal operation<br>Information communication: degeneration A1 | Facility control:normal operation<br>Information communication: normal operation | Facility control:normal operation<br>Information communication: degeneration C1 |
| Level 2 | Facility control: degeneration A2<br>Information communication: degeneration A3 | Facility control: degeneration B1<br>Information communication: degeneration B2 | Facility control:normal operation<br>Information communication: degeneration C2 |
| Level 3 | Facility control: stoppage<br>Information communication: degeneration A4 | Facility control: stoppage<br>Information communication: degeneration B3 | Facility control: degeneration C3<br>Information communication: degeneration C4 |
| ... | ... | ... | ... |

|  | | | |
|---|---|---|---|
| 1st question | There is work related to human safety | Yes | No |
| 2nd question | Stoppage is related to other processes | Yes | No |
| 3rd question | Stoppage causes disposal | Yes | No |
| 4th question | It is necessary to keep trail information strictly | Yes | No |
| 5th question | Degeneration operation affects other processes | Yes | No |
| 6th question | Emergency stoppages puts load on machine | Yes | No |

636

(B)

638

| 1 | 2 | 3 | 4 | 5 | 6 | Type |
|---|---|---|---|---|---|---|
| Yes | No | No | No | No | No | I |
| Yes | Yes | No | No | No | No | II |
| Yes | Yes | Yes | No | No | No | III |
| Yes | Yes | Yes | Yes | No | No | III |
| Yes | Yes | Yes | Yes | Yes | No | |
| Yes | No | Yes | No | No | No | IV |
| ... | ... | ... | ... | ... | ... | ... |

FIG. 21

Setting details check — 646

| Incident characteristic | Facility A (Operation) | Facility A (Maintenance) | Facility A (Setup change) |
|---|---|---|---|
| No (normal operation) | Facility control:normal operation Information communication: normal operation | Facility control:normal operation Information communication: normal operation | Facility control:normal operation Information communication: normal operation |
| Random alteration | Facility control:normal operation Information communication: degeneration A1 | Facility control:normal operation Information communication: normal operation | Facility control:normal operation Information communication: degeneration A1 |
| Resource exhaustion | Facility control: degeneration A2 Information communication: degeneration A3 | Facility control:normal operation Information communication: degeneration A7 | Facility control: degeneration A2 Information communication: degeneration A3 |
| DDoS attack | Facility control: degeneration A4 Information communication: degeneration A5 | Facility control: degeneration A8 Information communication: degeneration A9 | Facility control: degeneration A4 Information communication: degeneration A10 |
| ... | | | |

648:
- Normal operation
- degeneration
- operation stoppage

[Back] [Yes]

FIG. 22

CONTROLLER SYSTEM

CROSS-REFERENCE TO RELATED APPLICATION

This application is a 371 application of the International PCT application serial no. PCT/JP2019/045550, filed on Nov. 21, 2019, which claims the priority benefits of Japan Patent Application No. 2018-222649, filed on Nov. 28, 2018 and Japan Patent Application No. 2019-114336, filed on Jun. 20, 2019. The entirety of each of the above-mentioned patent applications is hereby incorporated by reference herein and made a part of this specification.

BACKGROUND

Technical Field

The present invention relates to a security function for a controller system controlling a control target.

Related Art

A control device such as a programmable logic controller (PLC) is used for controlling various facilities and various devices provided in each facility. The control device may monitor an abnormality occurring in a control target facility or machine and may also monitor an abnormality occurring in the control device. When any abnormality is detected, the control device provides a notification to the outside according to any method.

For example, Japanese Patent Application Laid-Open No. 2000-137506 (Patent Literature 1) discloses a programmable controller that transmits an electronic mail to a destination designated in advance when an abnormality history is registered or a predefined time comes.

CITATION LIST

Patent Literature

[Patent Literature 1]
Japanese Patent Application Laid-Open No. 2000-137506

SUMMARY

Technical Problem

With the progress of information and communication technology (ICT) in recent years, a control device is also connected to various external devices via a network, and the processing executed by the control device is also becoming more sophisticated. Due to such networking or intelligence, the types of threats that can be assumed are increasing.

Control devices of the related art only detect abnormalities that occur in facilities and machines, or abnormalities that occur in the control devices, and threats that may occur due to networking or intelligence are not supposed.

One objective of the present invention is to address the novel problem of protecting against threats that can arise as a result of the development of networked or intelligent control devices and control systems.

Solution to Problem

According to an aspect of the present invention, there is provided a controller system including a control unit that executes control calculation for controlling a control target; and a security unit that is connected to the control unit and oversees and manages security functions for the controller system. The security unit includes a detection means for detecting whether or not any unauthorized intrusion into the controller system has occurred. The control unit includes a command transmission means for transmitting commands for changing a behavior of the detection means of the security unit.

According to the aspect, it is possible to flexibly control a behavior of the security unit when a control target returns to a normal operation after any unauthorized intrusion is detected and then a factor of the unauthorized intrusion is removed.

The commands for changing the behavior of the detection means may include a command for recovering detection of the unauthorized intrusion in the detection means. According to the aspect, it is possible to facilitate recovery after detection of the unauthorized intrusion.

The commands for changing the behavior of the detection means may include a command for changing a level at which the detection means detects whether or not the unauthorized intrusion has occurred. According to the aspect, the control unit side can change a detection level, and thus it is possible to realize a flexible control operation depending on situations.

The command transmission means may transmit the commands for changing the behavior of the detection means in response to a user operation. According to the aspect, since a process such as recovery is started in response to the user's explicit operation, a security risk can be reduced.

The control unit may be configured to execute a user program including instructions related to the control calculation, and the user program may include an instruction for transmitting the commands for changing the behavior of the detection means. According to the aspect, the instruction for controlling the behavior of the detection means can be included in the user program in addition to the control operation, and thus it is possible to realize the flexible control operation.

According to another aspect of the present invention, there is provided a controller system including a control unit that executes control calculation for controlling a control target; a security unit that is connected to the control unit and oversees and manages security functions for the controller system; and a support device capable of accessing at least the control unit. The security unit includes a detection means for detecting whether or not any unauthorized intrusion into the controller system has occurred. The control unit is configured to execute control calculation in accordance with the unauthorized intrusion detected by the detection means. The support device receives a setting related to the control calculation executed by the control unit in accordance with the unauthorized intrusion detected by the detection means.

According to the aspect, after any unauthorized intrusion is detected, setting for executing a process corresponding to the unauthorized intrusion can be easily performed.

The support device may receive designation of a program to be executed by the control unit when the unauthorized intrusion is detected by the detection means. According to the aspect, it is possible to facilitate designation of a program required for a countermeasure when unauthorized intrusion is detected by the detection means.

The support device may receive designation of a type of unauthorized intrusion as a condition on which the program is executed by the control unit. According to the aspect, when a specific type of unauthorized intrusion is detected among various types of unauthorized intrusion, a specific program can be executed.

The support device may have a plurality of model settings defining typical behaviors of a control operation, and reflect any of the plurality of model settings in the control unit in response to a user operation. According to the aspect, even a user without expertise can perform necessary setting.

Each of the plurality of model settings may be associated with a facility category, and the support device may select and reflect a corresponding model setting in accordance with a user's selection of a facility. According to the aspect, a necessary setting can be reflected simply by selecting a target facility.

The support device may present one or a plurality of questions to a user via an interactive interface, and select and reflect a target model setting among the plurality of model settings in accordance with the user's selection for each question. According to the aspect, a necessary setting can be reflected simply by making an answer to a question.

According to still another aspect of the present invention, there is provided a controller system including a control unit that executes control calculation for controlling a control target; a security unit that is connected to the control unit and oversees and manages security functions for the controller system; and a support device capable of accessing at least the control unit. The security unit includes a detection means for detecting whether or not any unauthorized intrusion into the controller system has occurred, and a presentation means for presenting, to a user, a security risk calculated on the basis of a detection operation of the detection means.

According to the aspect, even if unauthorized intrusion has not been detected, it is possible to recognize at a glance whether or not a risk is increasing.

The presentation means may include an indicator for visually presenting the security risk. According to the aspect, it is possible to recognize at a glance whether or not a risk is increasing.

The presentation means may include a voice generation part for aurally presenting the security risk. According to the aspect, it is possible to promptly recognize the security risk.

The presentation means may change a presentation aspect depending on a degree of the calculated security risk. According to the aspect, the user can easily understand the degree of security risk on the basis of a presentation aspect.

According to still another aspect of the present invention, there is provided a controller system including a control unit that executes control calculation for controlling a control target; and a security unit that is connected to the control unit and oversees and manages security functions for the controller system. The security unit includes a detection means for detecting whether or not any unauthorized intrusion into the controller system has occurred, and a notification means for notifying the control unit of an incident characteristic indicating an attribute of the unauthorized intrusion detected by the detection means. The control unit changes a control operation depending on the incident characteristic of which a notification is provided from the notification means.

According to the aspect, the control unit can realize a control operation corresponding to detected unauthorized intrusion.

The control unit may stop an operation of a control target by changing the control operation. According to the aspect, it is possible to safely stop an operation of a control target by detecting unauthorized intrusion.

The control unit may restrict an operation of a control target by changing the control operation. According to the aspect, since unauthorized intrusion is detected, an operation of a control target can be restricted, and, even if an incident occurs, damage to the control target can be prevented.

The control unit may restrict an operation of a device included in the controller system by changing the control operation. According to the aspect, an operation of the device included in the controller system can be restricted and the progress to an incident can be prevented by detecting unauthorized intrusion.

The control unit may change the control operation by executing a program correlated with the incident characteristic of which the notification is provided. According to the aspect, a program corresponding to each incident characteristic can be prepared in advance, and thus it is possible to realize control operations corresponding to various types of unauthorized intrusion.

Effects

According to the present invention, it is possible to address the novel problem of protecting against threats that can arise as a result of the development of networked or intelligent control devices and control systems.

BRIEF DESCRIPTION OF THE DRAWINGS

FIG. 9 is a diagram illustrating an example of a control operation of each facility in accordance with incident characteristics in the controller system according to the present embodiment.

FIG. 10 is a diagram illustrating another example of a control operation of each facility in accordance with incident characteristics in the controller system according to the present embodiment.

FIG. 11 is a diagram illustrating an example of a state-based control operation of each facility in accordance with incident characteristics in the controller system according to the present embodiment.

FIG. 18 is a diagram illustrating examples of model settings for a control operation in accordance with an incident characteristic provided by the controller system according to the present embodiment.

FIG. 21 is a diagram for describing still another process procedure for setting a control operation in the controller system according to the present embodiment.

FIG. 22 is a schematic diagram illustrating an example of a user interface screen for changing settings of a control operation in the controller system according to the present embodiment.

DESCRIPTION OF THE EMBODIMENTS

Figure 1:
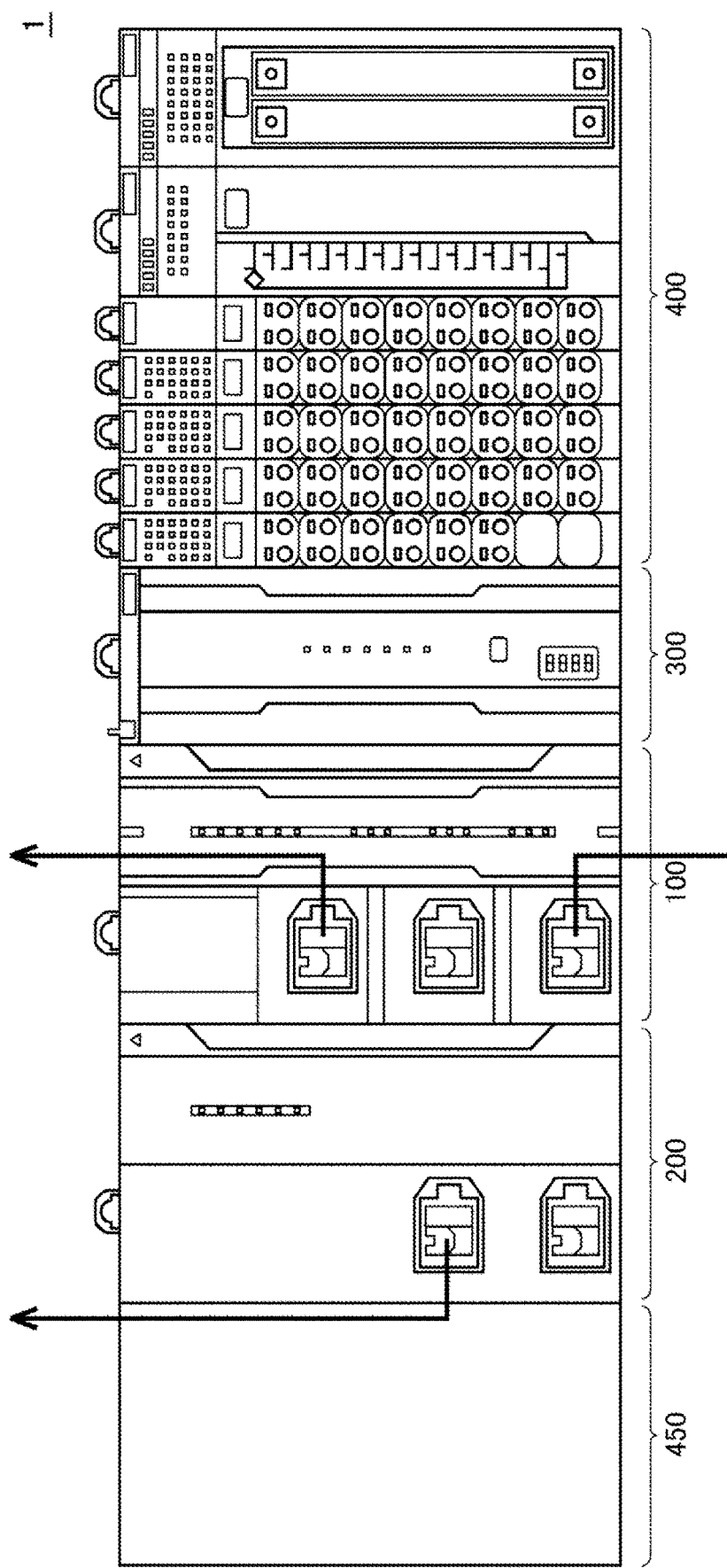
FIG. 1 is an exterior diagram illustrating a configuration example of a controller system according to the present embodiment.

An embodiment of the present invention will be described with reference to the drawings. The same or similar portions in the drawings will be given the same reference numeral, and description thereof will not be repeated.

A. Controller System 1

First, a configuration of a controller system 1 according to the present embodiment will be described.

FIG. 1 is an exterior diagram illustrating a configuration example of the controller system 1 according to the present embodiment. With reference to FIG. 1, the controller system 1 includes a control unit 100, a security unit 200, a safety unit 300, one or a plurality of functional units 400, and a power unit 450.

The control unit 100 and the security unit 200 are connected to each other via any data transmission path (for example, PCI Express or Ethernet (registered trademark)). The control unit 100, the safety unit 300, and the one or plurality of functional units 400 are connected to each other via an internal bus (not illustrated).

The control unit 100 executes principal processes in the controller system 1. The control unit 100 executes control calculation for controlling a control target according to request specifications that have been freely designed. The control calculation executed by the control unit 100 will also be referred to as "standard control" compared with control calculation executed by the safety unit 300 that will be described later. In the configuration example illustrated in FIG. 1, the control unit 100 has one or a plurality of communication ports.

The security unit 200 is connected to the control unit 100 and oversees and manages security functions for the controller system 1. In the configuration example illustrated in FIG. 1, the security unit 200 has one or a plurality of communication ports. Details of the security functions provided by the security unit 200 will be described later.

The safety unit 300 executes control calculation for realizing a safety function related to a control target independently from the control unit 100. The control calculation executed by the safety unit 300 will also be referred to as "safety control". Typically, the "safety control" is designed to satisfy requirements for realizing safety functions regulated in the IEC 61508. "Safety control" is a general term for processes for preventing human safety from being threatened by facilities, machines, or the like.

The functional unit 400 provides various functions for realizing control for various control targets in the controller system 1. The functional unit 400 may typically include an I/O unit, a safety I/O unit, a communication unit, a motion controller unit, a temperature adjustment unit, a pulse counter unit, and the like. The I/O unit may include, for example, a digital input (DI) unit, a digital output (DO) unit, an analog input (AI) unit, an analog output (AO) unit, a pulse catch input unit, and a complex unit in which plural types of units are combined with each other. The safety I/O unit oversees and manages I/O processes related to the safety control.

The power unit 450 supplies power with a predetermined voltage to each unit configuring the controller system 1.

B. Hardware Configuration Example of Each Unit

Next, a hardware configuration example of each unit configuring the controller system 1 according to the present embodiment will be described.

(b1: Control Unit 100)

Figure 2:
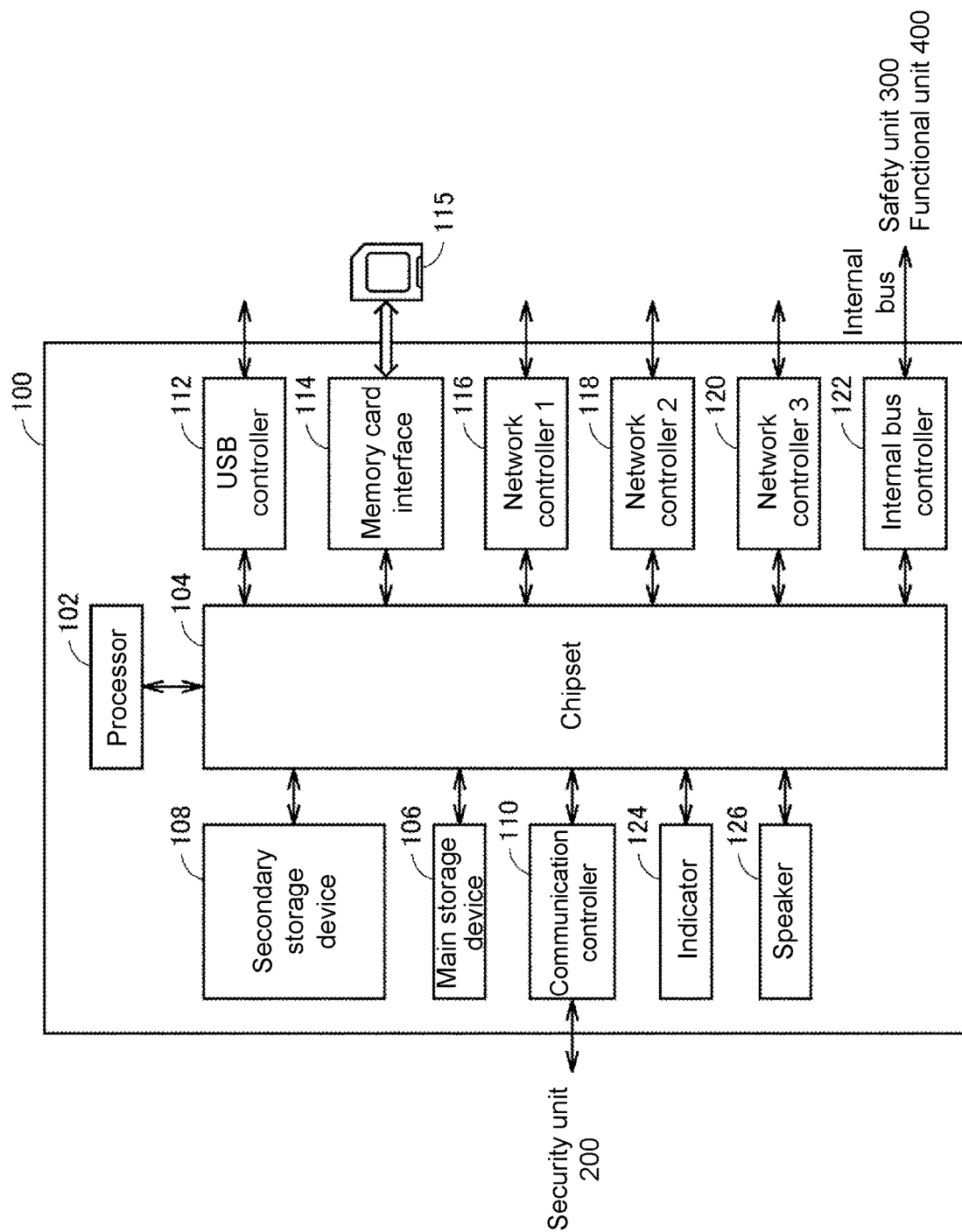
FIG. 2 is a schematic diagram illustrating a hardware configuration example of a control unit configuring the controller system according to the present embodiment.

FIG. 2 is a schematic diagram illustrating a hardware configuration example of the control unit 100 configuring the controller system 1 according to the present embodiment. With reference to FIG. 2, the control unit 100 includes, as principal components, a processor 102 such as a central processing unit (CPU) or a graphical processing unit (GPU), a chipset 104, a main storage device 106, a secondary storage device 108, a communication controller 110, a Universal Serial Bus (USB) controller 112, a memory card interface 114, network controllers 116, 118, and 120, an internal bus controller 122, an indicator 124, and a speaker 126.

The processor 102 reads various programs stored in the secondary storage device 108, loads the programs to the main storage device 106, and executes the programs to realize control calculation related to the standard control and various processes that will be described later. The chipset 104 mediates the exchange of data between the processor 102 and each component to realize the overall process in the control unit 100.

The secondary storage device 108 stores not only a system program but also a control program that operates on an execution environment provided by the system program.

The communication controller 110 oversees and manages the exchange of data with the security unit 200. As the communication controller 110, for example, a communication chip supporting PCI Express or Ethernet may be employed.

The USB controller 112 oversees and manages the exchange of data with any information processing device via USB connection.

The memory card interface 114 is configured to be detachably attached with a memory card 115, and can record the control program or data such as various settings on the memory card 115 or read the control program or the data such as various settings from the memory card 115.

Each of the network controllers 116, 118, and 120 oversees and manages the exchange of data with any device via a network. The network controllers 116, 118, and 120 may employ an industrial network protocol such as EtherCAT (registered trademark), EtherNet/IP (registered trademark), DeviceNet (registered trademark), or CompoNet (registered trademark).

The internal bus controller 122 oversees and manages the exchange of data with the safety unit 300 or the one or plurality of functional units 400 configuring the controller system 1. For the internal bus, a manufacturer-specific communication protocol may be used, or a communication protocol that is the same as or compliant with any industrial network protocol may be used.

The indicator 124 provides notifications of an operation state and the like of the control unit 100, and is configured with one or a plurality of LEDs or the like disposed on a unit surface.

The speaker 126 provides notifications of an operation state and the like of the control unit 100, and is disposed on the unit surface to output voice.

FIG. 2 illustrates the configuration example in which the necessary functions are provided by the processor 102 executing the programs, but some or all of the provided functions may be installed by using a dedicated hardware circuit (for example, an application specific integrated circuit (ASIC) or a field programmable gate array (FPGA)). Alternatively, main parts of the control unit 100 may be realized by using hardware (for example, an industrial PC based on a general-purpose PC) conforming to a general-purpose architecture. In this case, a virtualization technique may be used to execute a plurality of operating systems (OSs) having different uses in parallel and also to execute necessary applications on each OS.

(b2: Security Unit 200)

Figure 3:
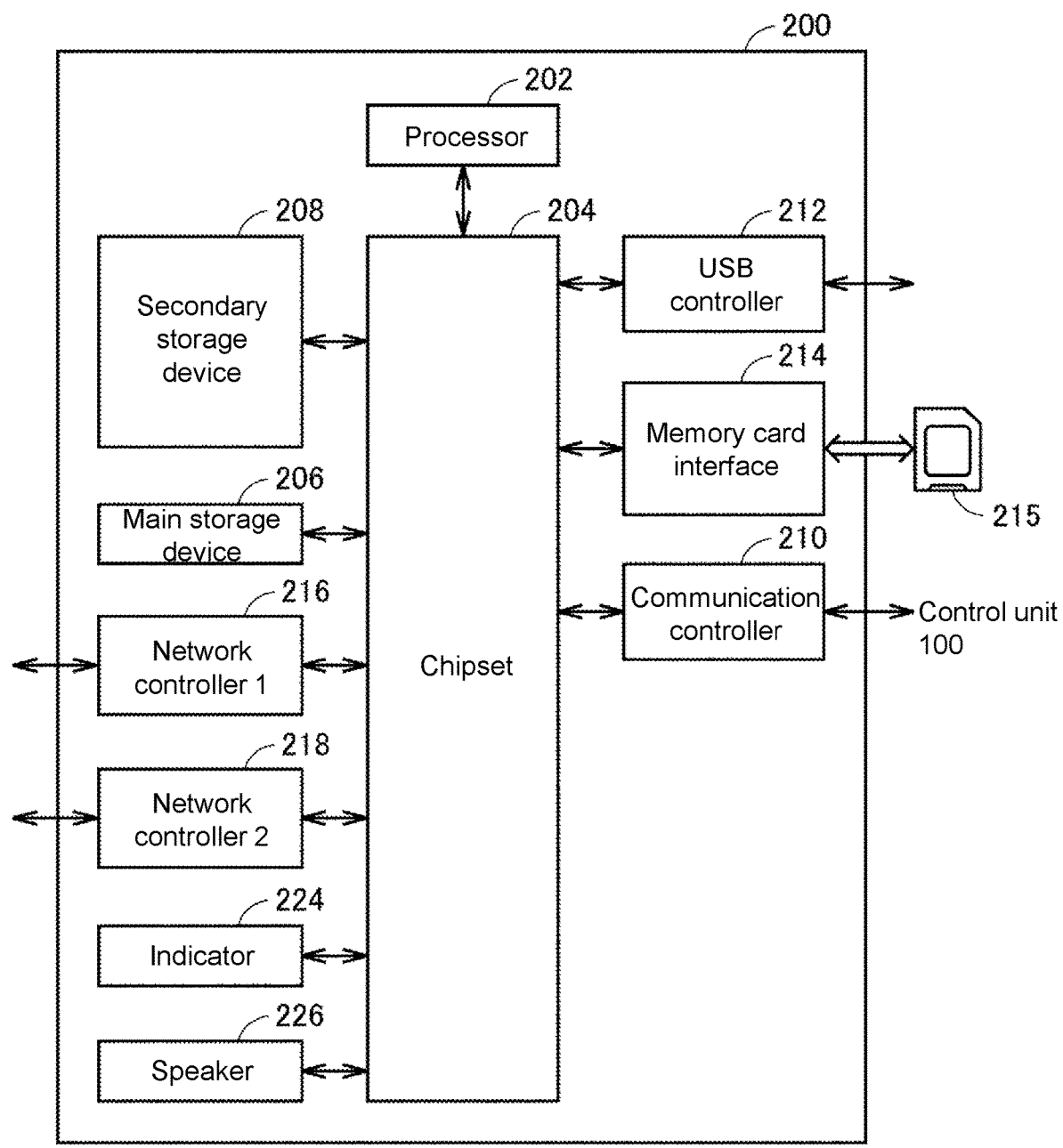
FIG. 3 is a schematic diagram illustrating a hardware configuration example of a security unit configuring the controller system according to the present embodiment.

FIG. 3 is a schematic diagram illustrating a hardware configuration example of the security unit 200 configuring the controller system 1 according to the present embodiment. With reference to FIG. 3, the security unit 200 includes, as principal components, a processor 202 such as a CPU or a GPU, a chipset 204, a main storage device 206, a secondary storage device 208, a communication controller 210, a USB controller 212, a memory card interface 214, network controllers 216 and 218, and an indicator 224.

The processor 202 reads various programs stored in the secondary storage device 208, loads the programs to the main storage device 206, and executes the programs to realize various security functions that will be described later. The chipset 204 mediates the exchange of data between the processor 202 and each component to realize the overall process in the security unit 200.

The secondary storage device 208 stores not only a system program but also a security system program that operates on an execution environment provided by the system program.

The communication controller 210 oversees and manages the exchange of data with the control unit 100. As the communication controller 210, for example, a communication chip coping with PCI Express or Ethernet may be employed in the same manner as the communication controller 110 of the control unit 100.

The USB controller 212 oversees and manages the exchange of data with any information processing device via USB connection.

The memory card interface 214 is configured to be detachably attached with a memory card 215, and can record a control program or data such as various settings on the memory card 215 or read the control program or the data such as various settings from the memory card 215.

Each of the network controllers 216 and 218 oversees and manages the exchange of data with any device via a network. The network controllers 216 and 218 may employ a general-purpose network protocol such as Ethernet (registered trademark).

The indicator 224 provides notifications of an operation state and the like of the security unit 200, and is configured with one or a plurality of LEDs or the like disposed on a unit surface.

The speaker 226 provides notifications of an operation state and the like of the security unit 200, and is disposed on the unit surface to output voice.

FIG. 3 illustrates the configuration example in which the necessary functions are provided by the processor 202 executing the programs, but some or all of the provided functions may be installed by using a dedicated hardware circuit (for example, an ASIC or an FPGA). Alternatively, main parts of the security unit 200 may be realized by using hardware (for example, an industrial PC based on a general-purpose PC) conforming to a general-purpose architecture. In this case, a virtualization technique may be used to execute a plurality of OSs having different uses in parallel and also to execute necessary applications on each OS.

(b3: Safety Unit 300)

Figure 4:
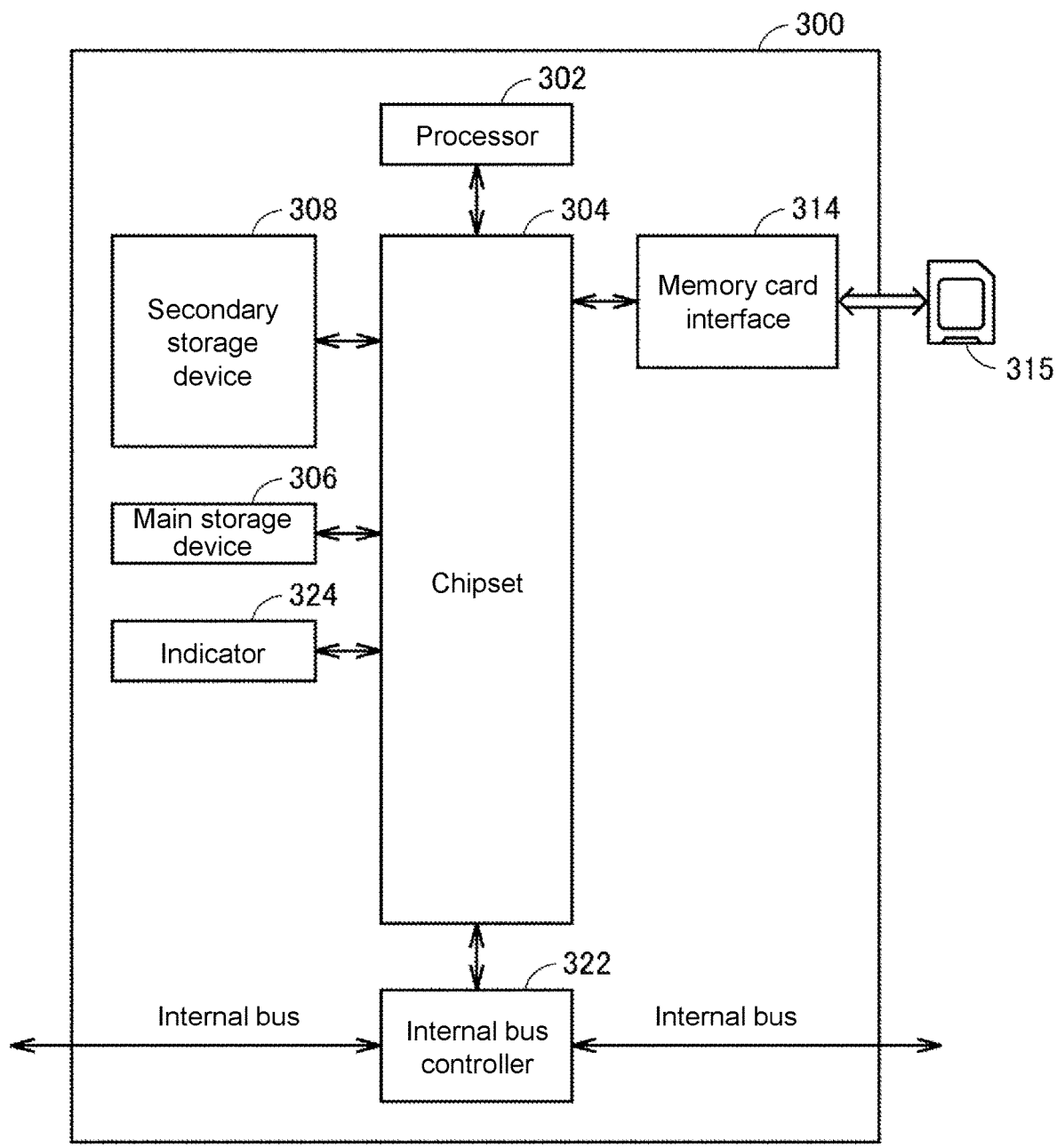
FIG. 4 is a schematic diagram illustrating a hardware configuration example of a safety unit configuring the controller system according to the present embodiment.

FIG. 4 is a schematic diagram illustrating a hardware configuration example of the safety unit 300 configuring the controller system 1 according to the present embodiment. With reference to FIG. 4, the safety unit 300 includes, as principal components, a processor 302 such as a CPU or a GPU, a chipset 304, a main storage device 306, a secondary storage device 308, a memory card interface 314, an internal bus controller 322, and an indicator 324.

The processor 302 reads various programs stored in the secondary storage device 308, loads the programs to the main storage device 306, and executes the programs to realize control calculation related to the standard control and various processes that will be described later. The chipset 304 mediates the exchange of data between the processor 302 and each component to realize the overall process in the safety unit 300.

The secondary storage device 308 stores not only a system program but also a safety program that operates on an execution environment provided by the system program.

The memory card interface 314 is configured to be detachably attached with a memory card 315, and can record the safety program or data such as various settings on the memory card 315 or read the safety program or the data such as various settings from the memory card 315.

The internal bus controller 322 oversees and manages the exchange of data with the control unit 100 via an internal bus.

The indicator 324 provides notifications of an operation state and the like of the safety unit 300, and is configured with one or a plurality of LEDs or the like disposed on a unit surface.

FIG. 4 illustrates the configuration example in which the necessary functions are provided by the processor 302 executing the programs, but some or all of the provided functions may be installed by using a dedicated hardware circuit (for example, an ASIC or an FPGA). Alternatively, main parts of the safety unit 300 may be realized by using hardware (for example, an industrial PC based on a general-purpose PC) conforming to a general-purpose architecture. In this case, a virtualization technique may be used to execute a plurality of OSs having different uses in parallel and also to execute necessary applications on each OS.

C. Control System 10

Figure 5:
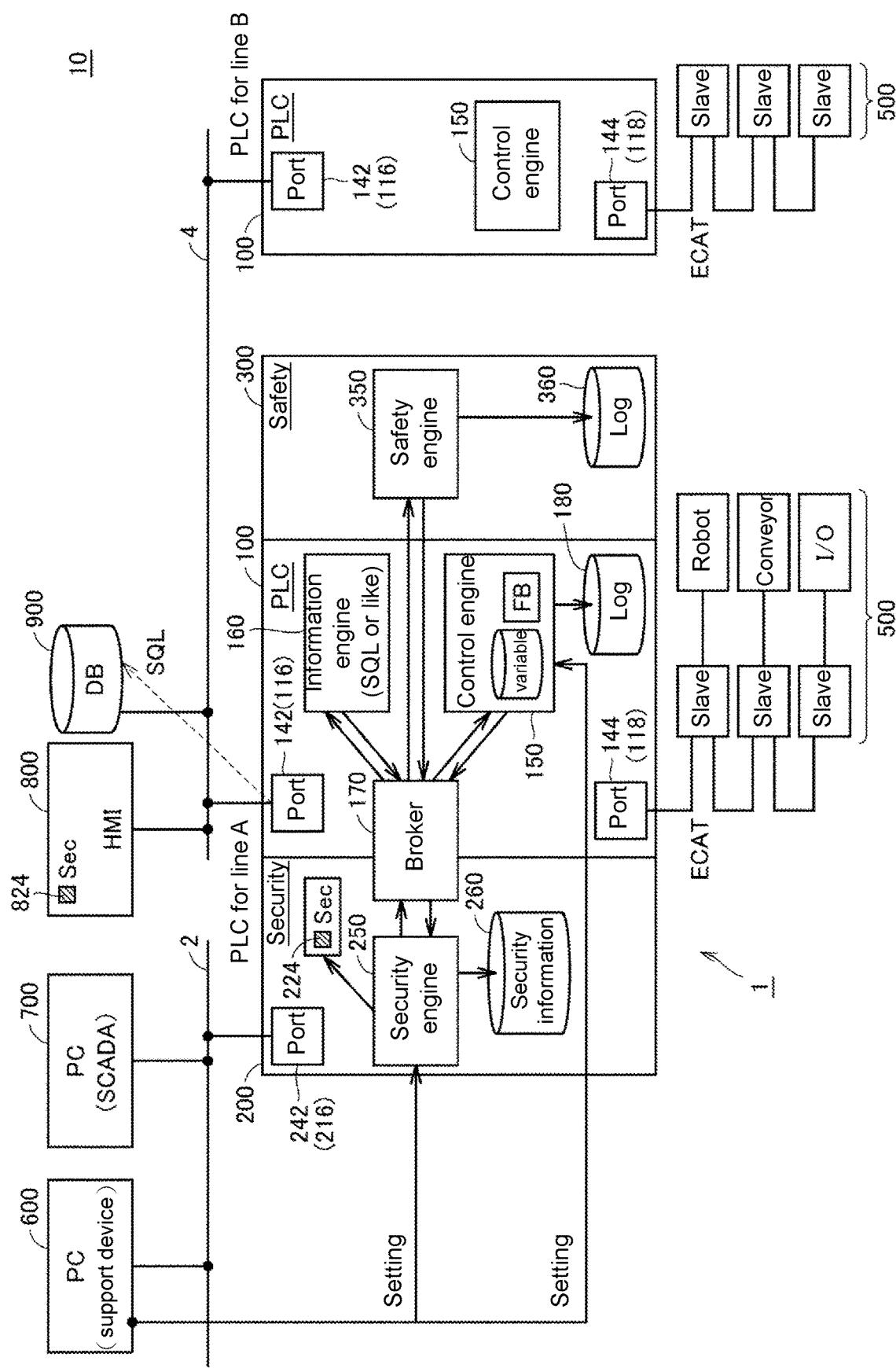
FIG. 5 is a schematic diagram illustrating a typical example of a control system including the controller system according to the present embodiment.

Next, a typical example of a control system 10 including the controller system 1 according to the present embodiment will be described. FIG. 5 is a schematic diagram illustrating a typical example of the control system 10 including the controller system 1 according to the present embodiment.

As an example, the control system 10 illustrated in FIG. 5 sets two lines (a line A and a line B) as control targets. Typically, it is assumed that not only a conveyor that conveys workpieces but also a robot that can apply any physical action on the workpieces on the conveyor is disposed in each line.

The control unit 100 is disposed in each of the line A and the line B. The security unit 200 and the safety unit 300 configure the controller system 1 in addition to the control unit 100 that oversees and manages the line A. For convenience of description, the functional unit 400 and the power unit 450 are not illustrated in FIG. 5.

The security unit 200 of the controller system 1 is connected to a first network 2 via a communication port 242 (the network controller 216 in FIG. 3). A support device 600 and a supervisory control and data acquisition (SCADA) device 700 are assumed to be connected to the first network 2.

The support device 600 capable of accessing at least the control unit 100, and provides functions such as creation of a program executed by each unit included in the controller system 1, debugging, and setting of various parameters to users.

The SCADA device 700 presents various information obtained through control calculation in the controller system 1 to an operator, and generates an internal command or the like for the controller system 1 in response to an operation from the operator. The SCADA device 700 also has a function of collecting data handled by the controller system 1.

The control unit 100 of the controller system 1 is connected to a second network 4 via a communication port 142 (the network controller 116 in FIG. 2). A human machine interface 800 and a database 900 are assumed to be connected to the second network 4.

The HMI 800 presents various information obtained through control calculation in the controller system 1 to an operator, and generates an internal command or the like for the controller system 1 in response to an operation from the operator. The database 900 collects various data (for example, information regarding traceability measured from each workpiece) transmitted from the controller system 1.

The control unit 100 of the controller system 1 is connected to one or a plurality of field devices 500 via a communication port 144 (the network controller 118 in FIG. 2). The field device 500 includes a sensor or a detector that collects various information required for control calculation from a control target, an actuator that applies any action to the control target, and the like. In the example illustrated in FIG. 5, the field device 500 includes a robot that applies any external action to a workpiece, a conveyor that conveys the workpiece, an I/O unit that exchanges signals with a sensor or an actuator disposed in a field, and the like.

Similarly, the control unit 100 that oversees and manages the line B is connected to one or a plurality of field devices 500 via the communication port 144 (the network controller 118 in FIG. 2).

Focusing on the functions of the controller system 1, the control unit 100 includes a control engine 150 that is a process execution part that executes control calculation related to the standard control, and an information engine 160 that exchanges data with an external device. The security unit 200 includes a security engine 250 for realizing a security function that will be described later. The safety unit 300 includes a safety engine 350 that is a process execution part that executes control calculation related to the safety control.

Each engine is realized by any hardware element such as the processor of each unit, any software elements such as various programs, or a combination of the elements. Each engine may be installed in any form.

The controller system 1 includes a broker 170 that mediates the exchange between the engines. An entity of the broker 170 may be disposed in one or both of the control unit 100 and the security unit 200.

The control engine 150 stores a variable table and a function block (FB) required to execute control calculation for controlling a control target. Each variable stored in the variable table is a value that is acquired from the field device 500 through I/O refresh processing and is collected periodically, and each value is periodically reflected in the field device 500. A log of control calculation in the control engine 150 may be stored in a log database 180.

The information engine 160 executes any information processing on data (a variable value stored in the variable table) stored in the control unit 100. Typically, the information engine 160 performs a process of periodically transmitting the data stored in the control unit 100 to the database 900 or the like. SQL or the like is used for transmission of the data.

The security engine 250 executes detection of unauthorized intrusion occurring in the controller system 1, a process corresponding to the detected unauthorized intrusion, determination of whether or not an incident has occurred, a process corresponding to the incident that has occurred, and the like. A behavior of the security engine 250 is stored as security information 260.

The security engine 250 provides a notification of the occurrence of any event related to security, a level of the event that has occurred related to the security, or the like, by using the indicator 224.

The safety engine 350 corresponds to a detection means for detecting whether or not any unauthorized intrusion has occurred in the controller system 1. The safety engine 350 acquires and reflects I/O variables required to execute control calculation related to the safety control via the control unit 100. A log of the safety control in the safety engine 350 may be stored in a log database 360.

For example, when the security engine 250 detects any event, the broker 170 changes operations or the like of the control engine 150, the information engine 160, and the safety engine 350.

D. Countermeasure Cycle Against Security Threat

The controller system 1 according to the present embodiment can detect any security threat that hinders a normal operation of a facility or a machine and take necessary countermeasures.

In the present specification, the "security threat" refers to any event that hinders a normal operation of a facility or a machine. Here, the "normal operation" refers to a state in which the facility or the machine can be continuously operated according to a system design and a production plan. The concept of the "normal operation" includes ancillary processes such as start-up, maintenance, and a setup change of the facility or the machine, for continuously operating the facility or the machine according to the system design and the production plan.

In a control device centered on a PLC, typically, security threats may be considered from four aspects such as (1) an attack from a higher-level device such as a database, (2) an attack from a field device, (3) an attack via a support device, and (4) an attack via a storage medium attached to a control device, such as a memory card. All physical ports mounted on the control device have a security risk of being attacked.

The security unit 200 according to the present embodiment executes a process for detecting a security threat or a risk occurring in each aspect and enabling necessary countermeasures to be executed.

Generally, the security threats evolve over time, and thus countermeasures against the security threats are required to be executed continuously. Such continuous countermeasures against the security threats will be described.

Figure 6:
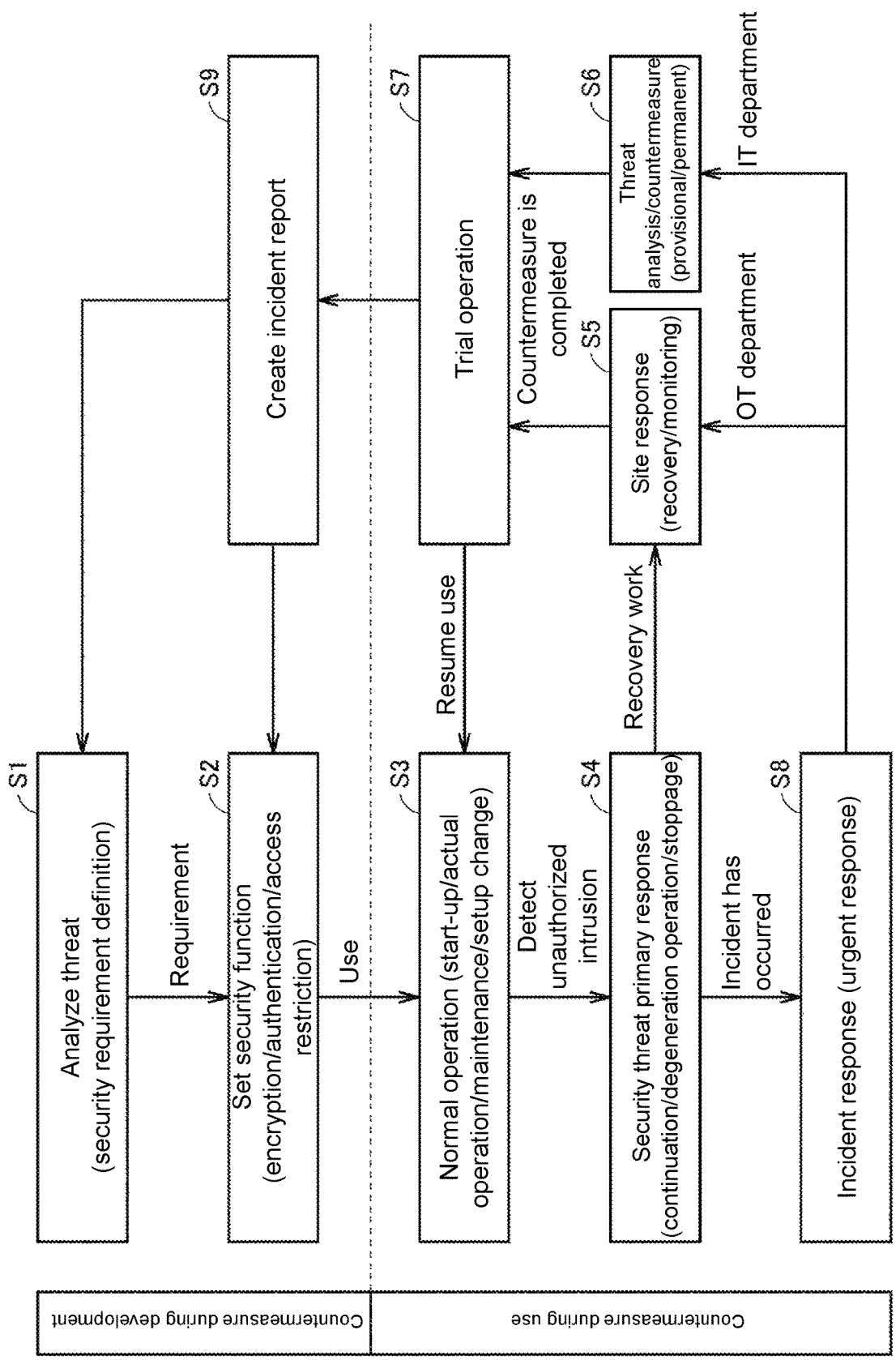
FIG. 6 is a schematic diagram illustrating an example of a countermeasure cycle against a security threat.

FIG. 6 is a schematic diagram illustrating an example of a countermeasure cycle against a security threat. With reference to FIG. 6, a countermeasure cycle against a security threat is generally roughly classified into (1) countermeasures (steps S1, S2, and S9) during development and (2) countermeasures during use (steps S3 to S8). (1) The countermeasures during development generally refer to countermeasures in a stage in which a design and a specification of a control target facility or machine are determined, and (2) the countermeasures during use generally refer to countermeasures in a stage in which the control target facility or machine is operated.

More specifically, first, analysis of a threat to a control target facility or machine is executed (step S1). Security requirement definition is determined in the threat analysis in step S1. Next, security function design is executed (step S2). In this security function design, security functions such as an encryption method, an authentication method, and access restriction are designed.

The details designed in steps S1 and S2 are reflected in the control target facility or machine, and then the use is started. The operation at this time is a normal operation (step S3). As described above, the normal operation includes processes such as start-up, an actual operation, maintenance, and a setup change of the facility or the machine.

It is assumed that any unauthorized intrusion is detected during the normal operation. A security threat primary response is executed (step S4).

Here, in the present specification, "detection of unauthorized intrusion" or "unauthorized intrusion detection" refers to detecting a phenomenon or an abnormality that may be any security threat. In other words, in the "detection of unauthorized intrusion", the occurrence of a phenomenon or a state different from that during normal times is just detected, a normal incident does not occur (however, there is a risk of the occurrence of the incident), and it cannot be reliably determined whether or not the phenomenon or the state different from that during normal times is unauthorized. Thus, it is not preferable, from the viewpoint of maintaining production activities, to block all processes and events just by detecting the unauthorized intrusion.

Therefore, in the countermeasure cycle against a security threat illustrated in FIG. 6, when unauthorized intrusion is detected, the security threat primary response is executed as a primary measure (step S4).

The security threat primary response is a primary measure in a situation in which there is a risk of the incident occurrence, and the progress to the incident occurrence may be prevented. Even if the incident has occurred, the damage can be minimized by executing the security threat primary response. In the controller system 1 according to the present embodiment, the security threat primary response is automatically executed through presetting.

Typically, the security threat primary response is roughly classified into three types such as continuation, degeneration, and stoppage.

The "continuation" in the security threat primary response refers to continuing the same operation as an operation immediately before the unauthorized intrusion is detected. However, it is preferable to provide a notification of the security threat with an alarm or the like such that further responses can be made promptly.

The "degeneration" in the security threat primary response refers to that the controller system continues to be operated in a limited manner, such as partial stoppage (only partial operation), performance reduction (performance degradation), and function restriction. In other words, in the "degeneration", the operation is continued even though there are some restrictions in terms of hardware or software compared with the operation immediately before the unauthorized intrusion is detected.

The "degeneration" in the security threat primary response may also include a general degeneration operation (fallback). Such a general degeneration operation refers to that the operation is maintained in a state in which the function or performance of the system is partially stopped. After switching to the degeneration operation, available functions are often suppressed to the minimum, or a response speed is slowed down.

The "stoppage" in the security threat primary response refers to stopping the operation of the system safely.

The security threat primary response is executed, and then recovery work is executed. In the control system 10 as illustrated in FIG. 5, a worker of an operation technology (OT) department oversees and manages the controller system 1 and the field side of the controller system 1, and a worker of an information technology (IT) department oversees and manages higher-level sides (the first network 2, the second network 4, and the devices connected to each network) of the controller system 1.

More specifically, the worker of the OT department performs a necessary process on the control target facility or machine (site response) (step S5). Specifically, work such as facility or machine recovery work or monitoring is executed. On the other hand, the worker of the IT department performs analysis of the security threat that has occurred and countermeasures against the security threat (step S6). The countermeasures taken by the worker of the IT department may include provisional countermeasures and permanent countermeasures.

When the countermeasures taken by the workers of the OT department and the IT department are completed, a trial operation is executed (step S7). When there is no problem in the trial operation, the use is resumed to return to the normal operation (step S3).

On the other hand, when the security threat primary response is executed (step S4), but if an incident occurs, an incident response is executed (step S8). The incident response is a response after the incident occurs, and includes urgent measures to restore the site and limit an influence range. In the controller system 1 according to the present embodiment, the incident response is also automatically executed through presetting.

After the incident response is executed, the worker of the OT department performs a necessary process on the control target facility or machine (site response) (step S5), and the worker of the IT department performs analysis of the security threat that has occurred and countermeasures against the security threat (step S6). An incident report is created (step S9), and the threat analysis (step S1), the security function design (step S2), and the like are executed again on the basis of details of the created incident report.

As described above, in a case where the incident has occurred, the details of the incident that has occurred are fed back to the development stage.

The incident report may be created even though an incident has not occurred.

As will be described later, the controller system 1 according to the present embodiment provides a structure in which the countermeasure cycle against a security threat illustrated in FIG. 6 can be reliably executed.

E. Security Threat Primary Response

Next, the security threat primary response (step S4) illustrated in FIG. 6 will be described.
(e1: Security Threat Primary Response in Control System 10)

First, detection of unauthorized intrusion (security threat) occurring in the control system 10 and an example of the security threat primary response corresponding thereto will be described.

Figure 7:
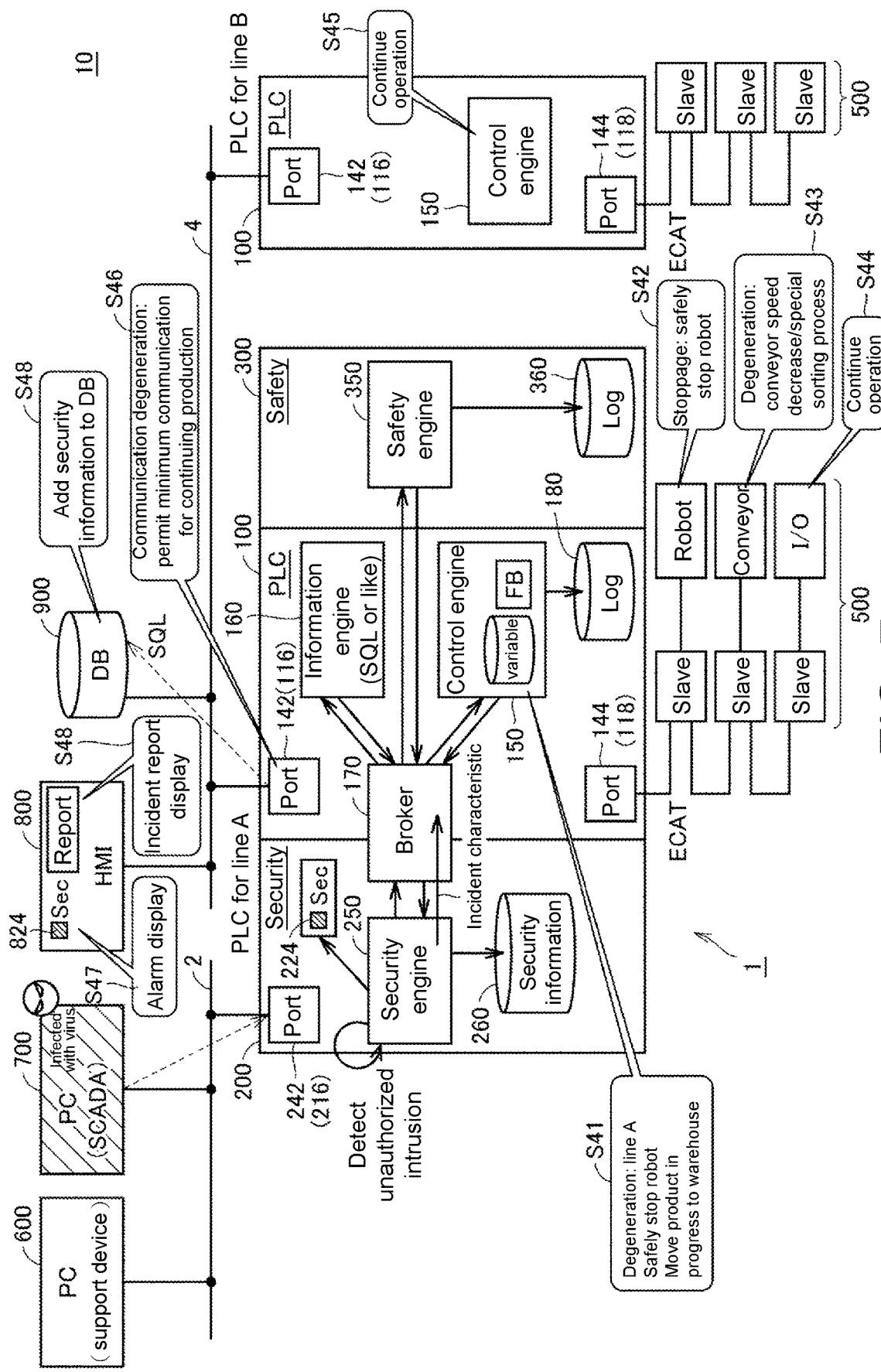
FIG. 7 is a schematic diagram illustrating an example of a response when unauthorized intrusion is detected in the control system including the controller system according to the present embodiment.

FIG. 7 is a schematic diagram illustrating an example of a response when unauthorized intrusion is detected in the control system 10 including the controller system 1 according to the present embodiment. FIG. 7 illustrates an example in which the SCADA device 700 is infected with a virus in the control system 10 illustrated in FIG. 5 and is attacked from the first network 2 and the communication port 242 of the security unit 200.

In the example illustrated in FIG. 7, it is assumed that only the controller system 1 that oversees and manages the line A is attacked, and the control unit 100 that oversees and manages the line B is not attacked. When unauthorized intrusion is detected, the security unit 200 notifies the control unit 100 or the like of incident characteristics of the detected unauthorized intrusion.

In the present specification, the "incident characteristics" is a term including attributes (for example, type of attack, attack characteristics, an attack level, severity, and urgency) of the detected unauthorized intrusion (security threat). The security engine 250 of the security unit 200 determines incident characteristics of the detected unauthorized intrusion (security threat) on the basis of a predefined detection logic, and outputs the determined incident characteristics to the control unit 100 or the like. In other words, the security engine 250 of the security unit 200 functions as a notification means for notifying the control unit 100 of the incident characteristics indicating attributes of the unauthorized intrusion that is detected by using the detection function.

The control unit 100 executes the security threat primary response and/or the incident response in accordance with the incident characteristics from the security unit 200. In other words, the control unit 100 changes a control operation in accordance with the incident characteristics of which the notification is provided from the security engine 250 of the security unit 200.

FIG. 7 illustrates an example in which the security threat primary response is executed. Specifically, the line A in which a workpiece conveyed on the conveyor is processed by the robot is assumed. In the line A, when unauthorized intrusion is detected, as an example, a process of safely stopping the robot that processes the workpiece and evacuating the workpiece that is a product in progress on the conveyor to a warehouse is executed as the security threat primary response.

In order to realize the security threat primary response, the control engine 150 of the control unit 100 executes a process of safely stopping the robot and moving the product in progress on the conveyor to the warehouse in the line A (step S41). The robot of the field device 500 is safely stopped in response to an instruction output by the control engine 150 (stoppage) (step S42), a conveyance speed of the conveyor of the field device 500 switches to a low speed, and a special sorting process for moving the product in progress to the warehouse is executed (degeneration) (step S43). On the other hand, the I/O unit of the field device 500 continues an operation (step S44). This is because input/output data that is updated periodically by the I/O unit is necessary for the control engine 150 to execute an appropriate process.

As described above, the control unit 100 that oversees and manages the line B is not influenced by the attack from the SCADA device 700 illustrated in FIG. 7, and thus the control engine 150 of the control unit 100 that oversees and manages the line B continues an operation (step S45).

With respect to the communication port 142 of the control unit 100, only the minimum communication for continuing production may be permitted (step S46). In other words, communication of the communication physical ports of the control unit 100 may be controlled. There is no limitation to the communication physical ports of the control unit 100, and communication of any communication physical ports of the security unit 200 and/or the safety unit 300 may be restricted when any unauthorized intrusion (security threat) is detected.

The control unit 100 displays an alarm for a notification of detection of the unauthorized intrusion (security threat) on an indicator 824 of the HMI 800 (step S47).

When the occurrence of an incident is received from the security unit 200, the control unit 100 may display an incident report on the HMI 800 (step S48).

As illustrated in FIG. 7, when the unauthorized intrusion (security threat) is detected, the controller system 1 may execute the security threat primary response in accordance with incident characteristics of the detected unauthorized intrusion.

(e2: Security Threat Primary Response in Other Facilities/Machines)

In FIG. 7 described above, a description has been made of the security threat primary response in a case where an attack is made by the SCADA device in the control system 10 having, as a control target, the line in which the robot capable of applying any physical action to a workpiece on the conveyor is disposed. However, in the security threat primary response, it is preferable to make response details different depending on at least a facility or a machine included in control targets, and incident characteristics.

(i) Data Alteration Attack on Processing Machine

For example, a case is assumed in which processing data (data defining a finished shape or the like) is altered with respect to a workpiece processing machine based on numerical control (NC) or the like. In this case, regarding the control of the processing machine and peripheral facilities of the processing machine, stoppage is employed as the security threat primary response, and human safety is prioritized.

On the other hand, regarding information communication processing, the security threat primary response is employed in which, basically, communication is blocked and isolated from other facilities (information communication processing), and a workpiece processed after the data alteration attack is made is specified (information processing).

(ii) DDoS Attack on Filling Machine

For example, a distributed denial of service (DDoS) attack on a liquid filling machine (bottling machine) for cans and bottles is assumed. Since a filling machine usually performs a filling operation at a high speed, sudden stoppage may cause problems in terms of damage to a facility and postprocessing of cans or bottles during filling. On the other hand, in the DDoS attack, only communication with the outside is affected, and it is often possible to operate the filling machine. Therefore, the security threat primary response is made in which the filling machine performs a normal operation or a degeneration operation (for example, a conveyance speed is gradually reduced).

On the other hand, regarding information communication processing in the control unit 100, the security threat primary response is employed in which, basically, communication is cut off and isolated from other facilities (information communication processing), and a workpiece processed after the data alteration attack is made is specified (information processing).

On the other hand, regarding the information communication processing, a process (that is, a target of the DDoS attack) of receiving information is blocked, and a process (for example, transmission of production information to a higher-level server) of transmitting information is continuously activated.

As described above, it is preferable to make response details different depending on a facility or a machine included in control targets, and incident characteristics.

F. Incident Response

Next, the incident response (step S8) illustrated in FIG. 6 will be described.

Figure 8:
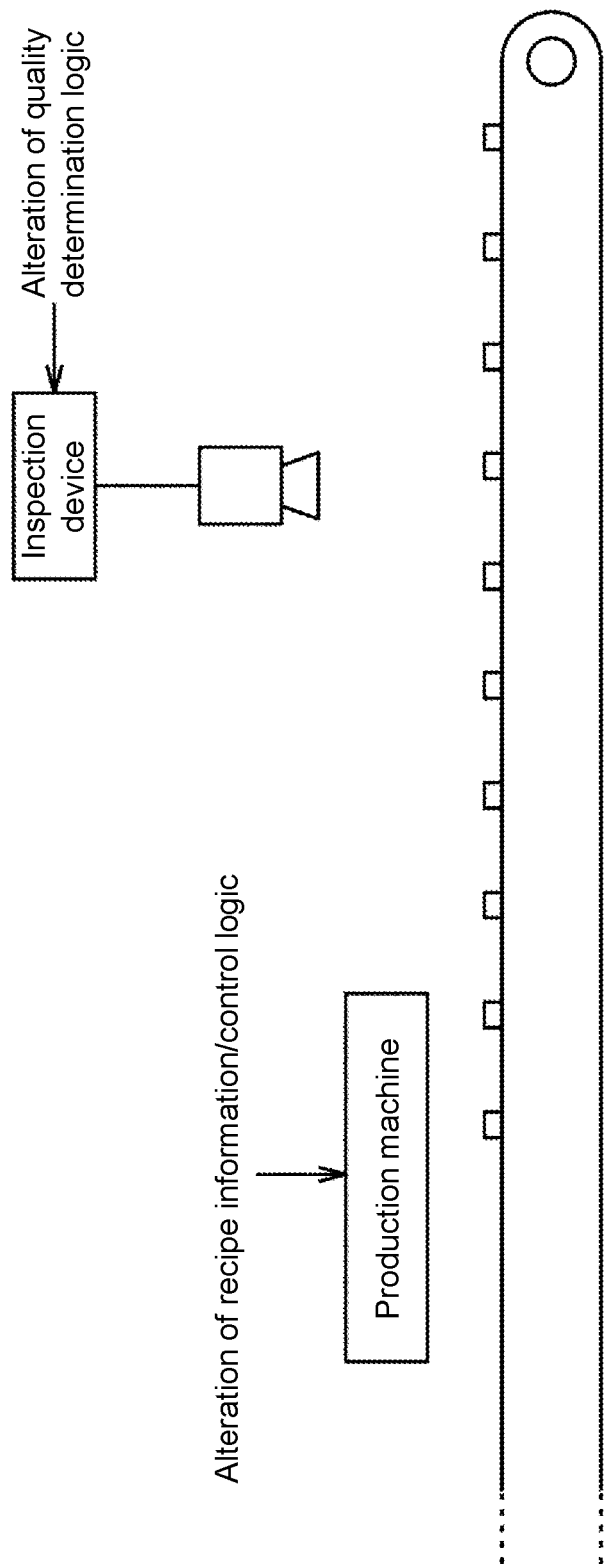
FIG. 8 is a schematic diagram illustrating an attack example on a line including a production machine and an inspection device.

FIG. 8 is a schematic diagram illustrating an attack example on a line including a production machine and an inspection device. With reference to FIG. 8, a line is assumed in which, for example, a production machine produces a product, and the product produced by the production machine is inspected by an inspection device disposed on the downstream side of the production machine and is then shipped.

With respect to such a line, an attacker plans to bring defective products to a market. In order to realize such a plan, the attacker alters the production machine to produce defective products, and further alters the inspection device such that the defective products cannot be detected.

As specific details of such an attack, for example, a quality determination logic of the inspection device is altered. That is, an attack is made in which the quality determination logic is intentionally rewritten such that the inspection device determines that a product is not defective.

Recipe information and/or a control logic for the production machine are (is) altered. That is, an attack is made in which control details are changed such that the production machine produces defective products.

When such an attack is received, an incident occurs and it is necessary to make a response to the incident. Also, regarding the response to the incident, it is preferable to change response details in accordance with incident characteristics.

In this example, responses to specific incidents are assumed as follows.

An inspection device that may have been altered is not used and is switched to another inspection device (inspection devices are made redundant, or products are sent to a safe inspection device in another line).

A logic (a quality determination logic or a control logic) before being altered is backed up and is automatically restored (the logic is automatically restored, and thus an end user does not have to make regular backups and can specify which past backups the user can determine to be safe).

Production in processes where risks may exist is stopped, while production in processes without other threats is continued (the number of products in progress is increased, but all processes are not required to be stopped).

Since a quality judgment result of an already produced product is also doubtful, the product is not stored in a regular warehouse, but is inspected again not to be distributed to the market as it is (the product may be sent to a line for re-inspection, and may be re-examined manually).

As described above, in the present embodiment, since the incident characteristics of the detected unauthorized intrusion (security threat) can be used, for example, as long as it can be guaranteed that quality determination of a product is properly executed, it is not necessary to completely stop the production line. If products to be re-inspected can be narrowed down, it is possible to avoid the spread of damage such as collection of all products.

G. Response in Accordance with Incident Characteristics

As described above, in the controller system 1 according to the present embodiment, when the security unit 200 detects unauthorized intrusion (security threat), the control unit 100 or the like is notified of incident characteristics of the detected unauthorized intrusion (security threat) (refer to FIG. 7 and the like). The control unit 100 and the safety unit 300 can make a response in an appropriate range and with appropriate details to the security threat on the basis of the incident characteristics (steps S4 and S8 in FIG. 6).

The controller system 1 according to the present embodiment can make details of control (that is, the security threat primary response or the incident response) in the control unit 100 and/or the safety unit 300 different in accordance with incident characteristics of detected unauthorized intrusion (security threat). Hereinafter, an example of determining control details in accordance with incident characteristics will be described.

FIG. 9 is a diagram illustrating an example of a control operation of each facility in accordance with incident characteristics in the controller system 1 according to the present embodiment. FIG. 10 is a diagram illustrating another example of a control operation of each facility in accordance with incident characteristics in the controller system 1 according to the present embodiment. FIG. 11 is a diagram illustrating an example of a state-based control operation of each facility in accordance with incident characteristics in the controller system 1 according to the present embodiment.

FIG. 9 illustrates an example in which the type of attack or a state after the attack (for example, random alteration, resource exhaustion, and a DDoS attack) is output from the security unit 200 as incident characteristics. A response is executed in accordance with each incident characteristic output from the security unit 200. Responses in accordance with incident characteristics may be set more finely for each facility or machine.

The responses in accordance with the incident characteristics may be roughly classified into a response for facility control and a response for information communication. The facility control generally refers to a process overseen and managed by the control engine 150 of the control unit 100 and/or the safety engine 350 of the safety unit 300 (refer to FIG. 5 with respect to all of the constituents), and refers to a response for an operation of a control target facility or machine. The information communication generally refers to a process overseen and managed by the information engine 160 of the control unit 100, and refers to a response for the exchange of data between the control unit 100 and an external device or handling of information in the control unit 100.

Among control operations illustrated in FIG. 9, a "normal operation" refers to a state in which a facility or a machine can be continuously operated according to a system design and a production plan. "Degeneration" (in the figure, identification information such as "A1" is added to the "degeneration") refers to that the controller system 1 continues to be operated in a limited manner, such as partial stoppage (only partial operation), performance reduction (performance degradation), and function restriction. "Stoppage" refers to safely stopping an operation of a target facility or machine or the controller system 1. The same also applies to FIG. 10 and FIG. 11.

FIG. 10 illustrates an example in which a level (severity, urgency, or the like) of detected unauthorized intrusion (security threat) is output from the security unit 200 as the incident characteristic. Each level is calculated on the basis of the type of detected attack, a state after the attack, or the like. A response is executed in accordance with each incident characteristic output from the security unit 200. Responses in accordance with incident characteristics may be set more finely for each facility or machine.

FIG. 11 illustrates an example in which a response is set in accordance with each incident characteristic for each state of a facility or a machine. For example, states such as operation in progress, maintenance in progress, and setup change in progress may be specified for each facility, and a response for each facility may be determined on the basis of a detected incident characteristic and the current state.

FIG. 11 illustrates a state of a facility or a machine, but there is no limitation thereto, and, for example, details of a response may be made different in accordance with an operation state (during a normal operation, during remote access, during debugging, or the like) of a PLC. A response in accordance with each incident characteristic may be determined on the basis of only a state. In other words, a response may be determined on the basis of only a state when a security threat is detected regardless of a difference in a facility or a machine.

The level illustrated in FIG. 10 may be used as the incident characteristic illustrated in FIG. 11.

As illustrated in FIG. 9 to FIG. 11, in the controller system 1 according to the present embodiment, a necessary response can be dynamically determined for each facility and/or each state in accordance with an incident characteristic output from the security unit 200. Since details of a response are dynamically determined, it is possible to maintain productivity by continuing operations of facilities and machines and flexibly take security countermeasures. FIG. 9 to FIG. 11 exemplify a control operation related to the standard control, but the same control operation may be defined for the safety control.

Next, an example of "degeneration" illustrated in FIG. 9 to FIG. 11 will be described.

(1) Degeneration of Facility Control

The degeneration of facility control refers to an operation with restrictions in terms of range, function, productivity, and the like.

Regarding the range, a zone that is a control target may be restricted. As the zone that is a control target, for example, a control side such as a control device, a module mounted on the control device, and a unit mounted on the control device may be restricted. Alternatively, a controlled side (control target) such as a specific machine, line, floor, or the entire factory may be restricted.

Regarding the function, among processes provided by the controller system 1, specific processes (for example, the information control, the standard control, and the safety control) may be restricted.

Regarding the productivity, the productivity (for example, a line speed, the number of products produced per unit time, and a production amount per unit time) may be temporarily limited for safety and security.

(2) Degeneration of Information Communication

The degeneration of information communication refers to an operation with restrictions in terms of range, direction, band, quality of service (QoS), and data.

Regarding the range, for example, a communication physical port, a communication logical port, and network withdrawal may be restricted.

In a case where the communication physical port is restricted, the use of a specific port among the communication ports provided in each of the control unit 100 and the security unit 200 may be restricted. Alternatively, among the communication ports mounted in the controller system 1, only the higher-level side or the field side may be activated.

In a case where the communication logical port is restricted, an available TCP/UDP port may be restricted, or an available communication protocol may be restricted. A MAC address or an IP address that accepts access may be restricted.

Regarding the direction, for example, a direction in which data flows in each port may be restricted to only one direction. For example, with respect to a specific port, only data reception may be permitted, or only data transmission may be permitted. Only such one-way data is allowed, and thus it is possible to prevent data from leaking from the controller system 1 when any security threat is detected.

Regarding the band, the communication speed may be restricted (for example, changed from 1 Gbps to 100 Mbps) in order to reduce a communication load or a processing load on the controller system 1.

Regarding the QoS, the priority of a packet to be passed may be dynamically changed. For example, in a case where any security threat is detected, the priority of the packet to be passed may be changed to a higher priority.

Regarding the data, for example, in an industrial network protocol such as EtherCAT, switching between activation and inactivation of process data communication or update of the output value may be restricted (for example, update stoppage/zero-clear/storage of previous value).

The "degeneration" is not limited to the above description, and may include an operation in a state in which any restriction is added to a normal operation. The "degeneration" may also be regarded as partial stoppage, and the "stoppage" may include complete stoppage of a specific function to be regarded as an extended concept of the "degeneration".

Figure 12:
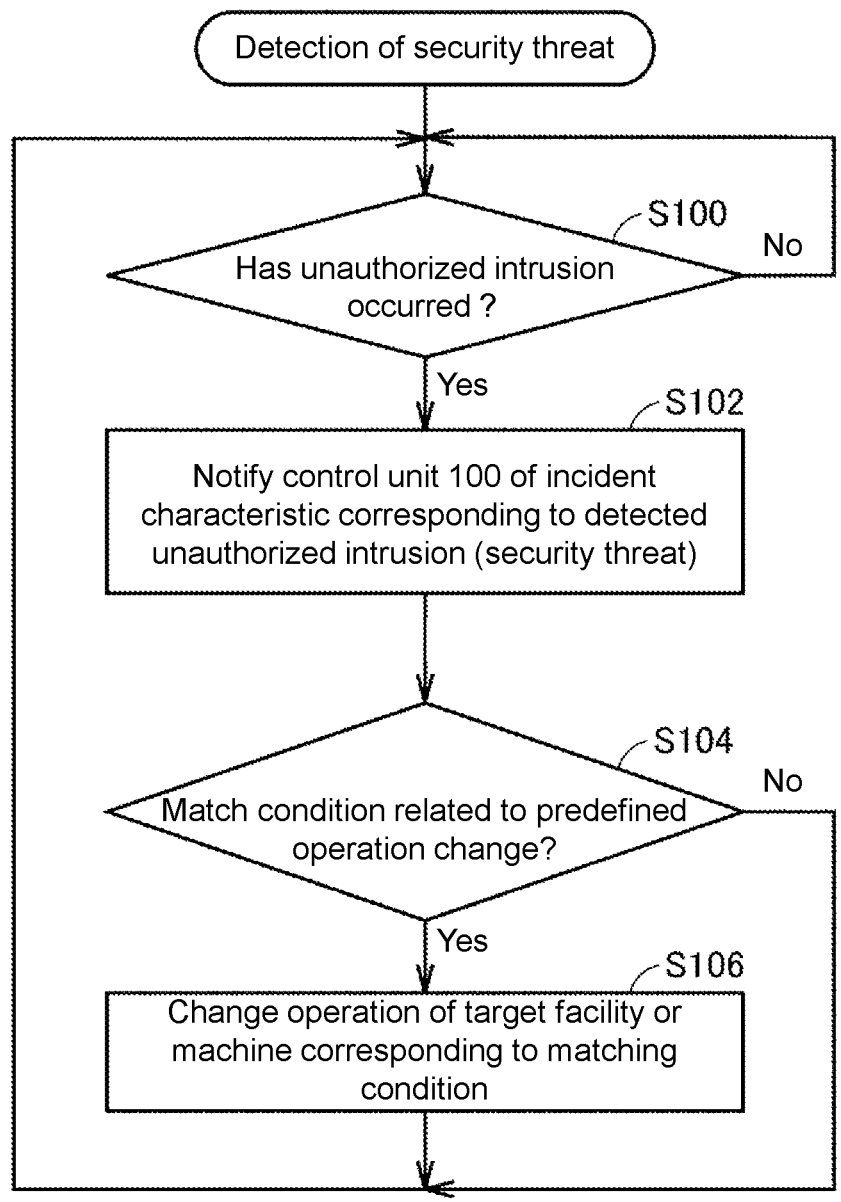
FIG. 12 is a flowchart illustrating a process procedure in a case where a security threat is detected in the controller system according to the present embodiment.

FIG. 12 is a flowchart illustrating a process procedure in a case where a security threat is detected in the controller system 1 according to the present embodiment. Each step illustrated in FIG. 12 is realized by each of the processor 102 of the control unit 100, the processor 202 of the security unit 200, and the processor 302 of the safety unit 300 executing the program.

With reference to FIG. 12, the security unit 200 determines whether or not unauthorized intrusion has occurred on the basis of processes occurring in the control unit 100, packets flowing on the network, and the like (step S100). When no unauthorized intrusion has occurred (NO in step S100), the process in step S100 is repeatedly performed.

When unauthorized intrusion has occurred (YES in step S100), the security unit 200 notifies the control unit 100 of an incident characteristic corresponding to the detected unauthorized intrusion (security threat) (step S102). The control unit 100 is notified of the incident characteristics from the security unit 200, and determines whether or not the incident characteristic matches a condition related to a predefined operation change (step S104).

When the incident characteristic matches the condition related to the predefined operation change (YES in step S104), the control unit 100 changes an operation of a target facility or machine corresponding to the matching condition (step S106).

In contrast, when the incident characteristic does not match the condition related to the predefined operation change (NO in step S104), a process in step S106 is skipped. The processes in step S100 and the subsequent steps are repeatedly performed.

H. Setting of Process when Unauthorized Intrusion is Detected

Next, an example of a user interface for setting a process when unauthorized intrusion is detected in the controller system 1 will be described. As illustrated in FIG. 5, the support device 600 performs setting for the controller system 1.

(h1: Support Device 600)

Figure 13:
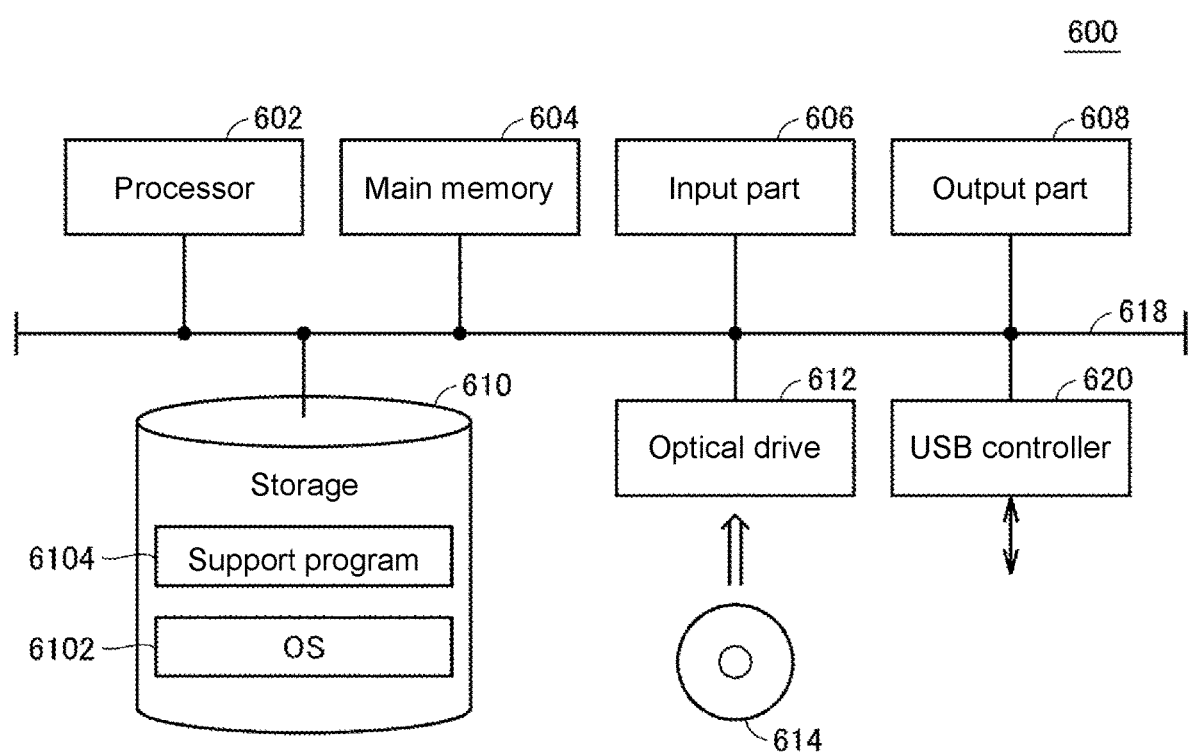
FIG. 13 is a schematic diagram illustrating a hardware configuration example of a support device connected to the controller system according to the present embodiment.

FIG. 13 is a schematic diagram illustrating a hardware configuration example of the support device 600 connected to the controller system 1 according to the present embodiment. The support device 600 is implemented by using hardware (for example, a general-purpose PC) conforming to a general-purpose architecture as an example.

With reference to FIG. 13, the support device 600 includes a processor 602, a main memory 604, an input part 606, an output part 608, a storage 610, an optical drive 612, and a USB controller 620. These components are connected to each other via a processor bus 618.

The processor 602 is configured with a CPU or a GPU, reads programs (for example, an OS 6102 and a support program 6104) stored in the storage 610, loads the programs to the main memory 604, and executes the programs to perform a setting process or the like on the controller system 1.

The main memory 604 is configured with a volatile storage device such as a DRAM or an SRAM. The storage 610 is configured with a nonvolatile storage device such as an HDD or an SSD.

The storage 610 stores not only the OS 6102 for realizing fundamental functions but also the support program 6104 for providing functions of the support device 600. In other words, the support program 6104 is executed by a computer connected to the controller system 1 to implement the support device 600 according to the present embodiment.

The input part 606 is configured with a keyboard, a mouse, and the like, and receives a user operation. The output part 608 is configured with a display, various indicators, a printer, and the like, and outputs a processing result or the like from the processor 602.

The USB controller 620 exchanges data with the controller system 1 or the like through USB connection.

The support device 600 has the optical drive 612, and a computer-readable program is read from a recording medium 614 (for example, an optical recording medium such as a digital versatile disc (DVD)) that stores the program in a non-transitory manner and is installed in the storage 610 or the like.

The support program 6104 or the like executed by the support device 600 may be installed via the computer-readable recording medium 614, or may be downloaded from a server device or the like on the network to be installed. The functions provided by the support device 600 according to the present embodiment may be realized in a form of using some modules provided by the OS.

FIG. 13 illustrates the configuration example in which the necessary functions of the support device 600 are provided by the processor 602 executing the programs, but some or all of the provided functions may be installed by using a dedicated hardware circuit (for example, an ASIC or an FPGA).

(h2: Measure Setting when Unauthorized Intrusion is Detected)

FIG. 14 to FIG. 17 are schematic diagrams illustrating examples of user interface screens for setting measures when unauthorized intrusion into the controller system 1 according to the present embodiment is detected. FIG. 14 to FIG. 17 illustrate examples of setting procedures in a case where unauthorized intrusion notification event task as an example is set in the control unit 100. The user interface screens illustrated in FIG. 14 to FIG. 17 are typically realized by the processor 602 of the support device 600 executing the support program 6104.

Figure 14:
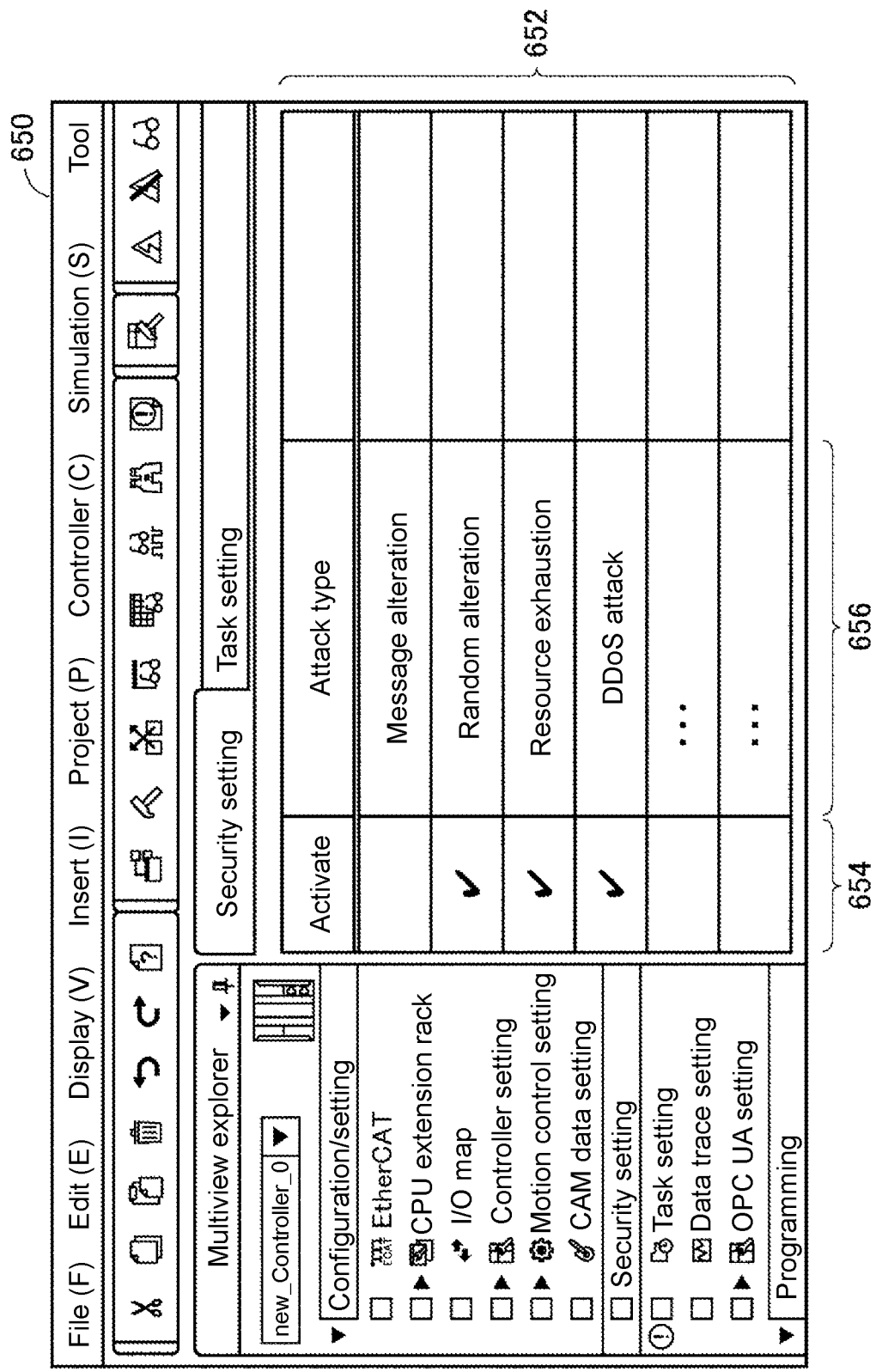
FIG. 14 is a schematic diagram illustrating an example of a user interface screen for setting measures when unauthorized intrusion into the controller system according to the present embodiment is detected.

A user interface screen 650 illustrated in FIG. 14 receives setting and registration of an incident characteristic of unauthorized intrusion of which a notification is provided from the security unit 200. Specifically, the user interface screen 650 has an incident characteristic setting/registration region 652. Types of unauthorized intrusion (security threats) that are detectable in the security unit 200 are displayed in a list form in the setting/registration region 652.

The setting/registration region 652 in FIG. 14 includes a column 656 for an "attack type", and a user checks an attack type (the type of detected unauthorized intrusion) activating a notification in a column 654 for "activation". In the example illustrated in FIG. 14, three attack types are activated. In other words, when an attack type checked in the user interface screen 650 illustrated in FIG. 14 is detected by the security unit 200, the control unit 100 is notified of a corresponding incident characteristic.

Figure 15:
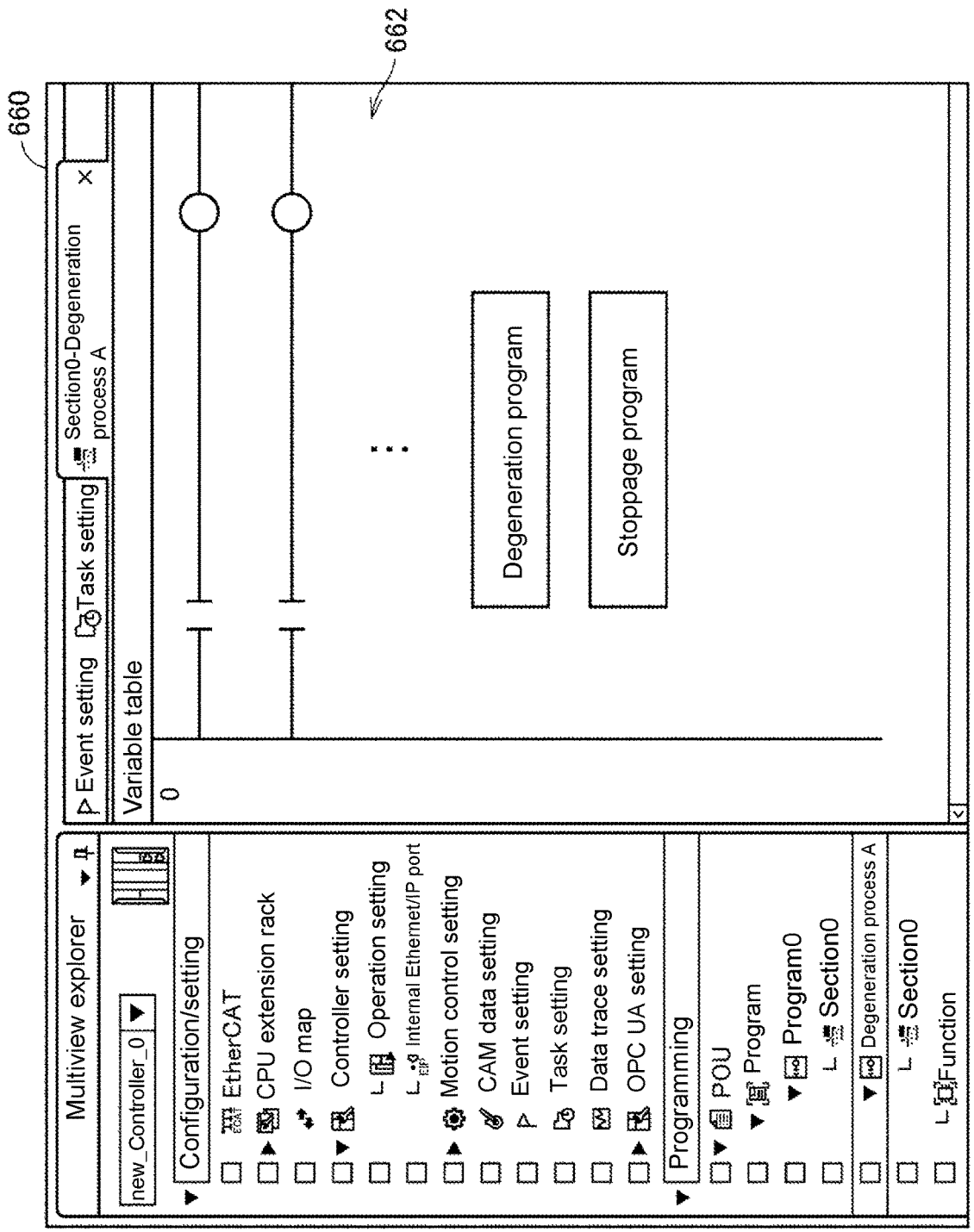
FIG. 15 is a schematic diagram illustrating an example of a user interface screen for setting measures when unauthorized intrusion into the controller system according to the present embodiment is detected.

A user interface screen 660 illustrated in FIG. 15 allows a program executed when a notification of an incident characteristic is provided from the security unit 200 to be created. Specifically, the user interface screen 660 has a program editing region 662, and the user writes a program (typically, a program for realizing the security threat primary response such as degeneration or stoppage) to be executed when a notification of a specific incident characteristic is provided in the program editing region 662. In the example illustrated in FIG. 15, it is assumed that a program for realizing degeneration is written and is registered as a "degeneration process A".

Figure 16:
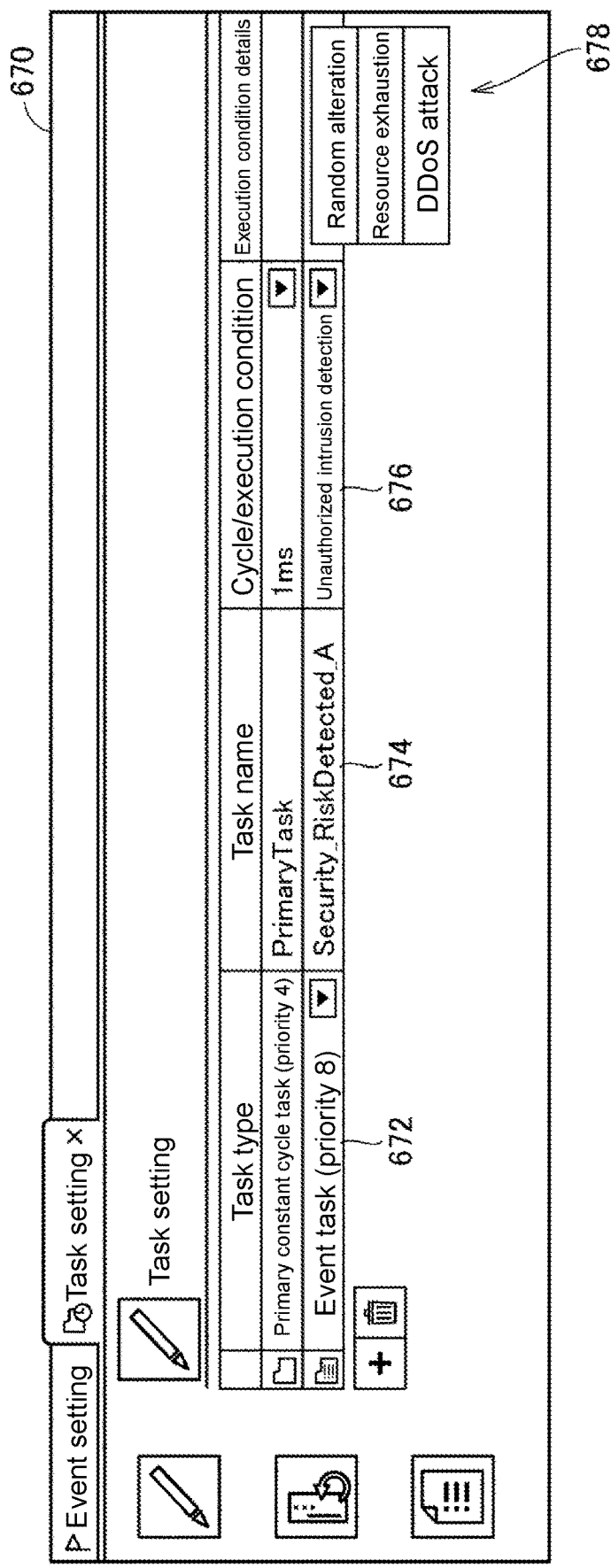
FIG. 16 is a schematic diagram illustrating an example of a user interface screen for setting measures when unauthorized intrusion into the controller system according to the present embodiment is detected.

A user interface screen 670 illustrated in FIG. 16 receives setting of an event task. The event task refers to a task executed only when a predefined condition is satisfied. More specifically, an "event task" is designated as a task type in a column 672 of the user interface screen 670. In a column 674, "Security_RiskDetected_A" is designated as a task name. This task name may be freely designated. In a column 676, "unauthorized intrusion detection" is designated as a cycle/execution condition. The "unauthorized intrusion detection" is designated, and thus it is defined that a notification of an incident characteristic from the security unit 200 is executed as an event.

As described above, the support device 600 receives designation of a program to be executed by the control unit 100 when unauthorized intrusion is detected by the security unit 200 via the user interface screen 670.

In a column 678, a condition for an incident characteristic of which a notification is provided from the security unit 200, that is, a category related to the incident characteristic is set. In the example illustrated in FIG. 16, three types of incident characteristics such as "random alteration", "resource exhaustion", and "DDoS attack" are presented, and the user selects one or a plurality of incident characteristics from among the incident characteristics. As described above, the support device 600 receives designation of the type of unauthorized intrusion as a condition under which a program is executed by the control unit 100 via the user interface screen 670.

Figure 17:
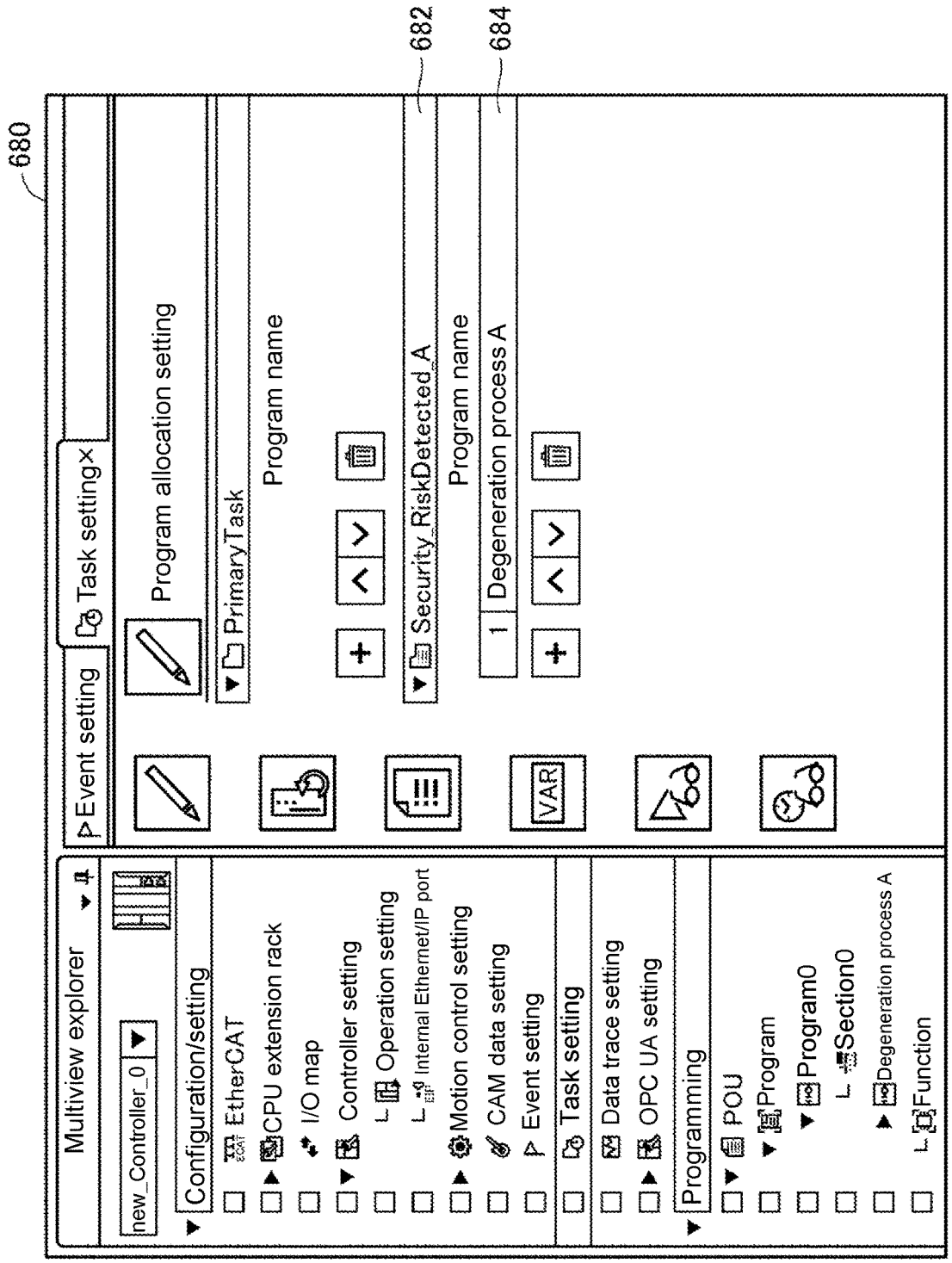
FIG. 17 is a schematic diagram illustrating an example of a user interface screen for setting measures when unauthorized intrusion into the controller system according to the present embodiment is detected.

A user interface screen 680 illustrated in FIG. 17 receives setting of allocating the program created on the user interface screen 660 illustrated in FIG. 15 to the task that is set on the user interface screen 670 illustrated in FIG. 16.

By selecting an object 682 indicating the task name displayed as "Security_RiskDetected_A" and setting the program registered as the "degeneration process A" in an input field 684, the program "degeneration process A" is executed as an event with a notification of the incident characteristic from the security unit 200 as a condition.

Through the above setting procedures, detection of unauthorized intrusion in the security unit 200, a notification of an incident characteristic provided from the security unit 200 to the control unit 100, and an operation change (execution of a program registered in advance) in accordance with the incident characteristic in the control unit 100 are realized. As described above, the support device 600 receives setting, a program, and the like related to control calculation executed by the control unit 100 in accordance with unauthorized intrusion detected by the security engine 250 of the security unit 200.

The control unit 100 changes a control operation by executing a program correlated with an incident characteristic of which a notification is provided. Similarly, the control unit 100 may stop an operation of a control target by changing the control operation. Alternatively, the control unit 100 may restrict (degeneration operation) the operation of the control target by changing the control operation.

The control unit 100 may also restrict an operation of a device included in the controller system 1 by changing the control operation.

In the above description, the example in which a process is set as the unauthorized intrusion notification event task has been described, but an installation form is not limited thereto. For example, a system variable indicating a notification of an incident characteristic from the security unit 200 may be prepared, and a program required for a degeneration process or a stoppage process may be created with the system variable as a starting condition.

The system variable may be referred to with any instruction in a user program by being mapped onto a user definition variable.

(h3: Facility-Based/State-Based Control Operation Setting)

Next, a description will be made of a function for supporting setting of a facility-based control operation and a state-based control operation in accordance with an incident characteristic in the controller system according to the present embodiment.

It is preferable to optimize a process in accordance with an incident that has occurred according to characteristics, specifications, or the like of a control target facility or machine, but setting the control operation requires some expertise. Therefore, as described below, a function for supporting setting of a control operation may be installed.

FIG. 18 is a diagram illustrating examples of model settings 630 for a control operation in accordance with an incident characteristic provided by the controller system according to the present embodiment. With reference to FIG. 18, the model settings 630 include a control operation in accordance with an incident characteristic for each of one or a plurality of predefined types. In other words, the support device 600 has a plurality of model settings 630 defining typical behaviors of the control operation.

Each type of control operation indicates a typical behavior, and may be changed as appropriate as will be described later. FIG. 18 illustrates an example of a model setting for each facility, but model settings (refer to FIG. 11 or the like) respectively corresponding to a facility and a state may be used. The same applies to the following description.

The support device 600 reflects any of the plurality of model settings 630 in the control unit 100 in response to a user operation. As a method of determining a control operation (model setting 630) in accordance with an incident characteristic, a method of selecting a target facility category may be used, and a method of interactively selecting the control operation may be used.

Figure 19:
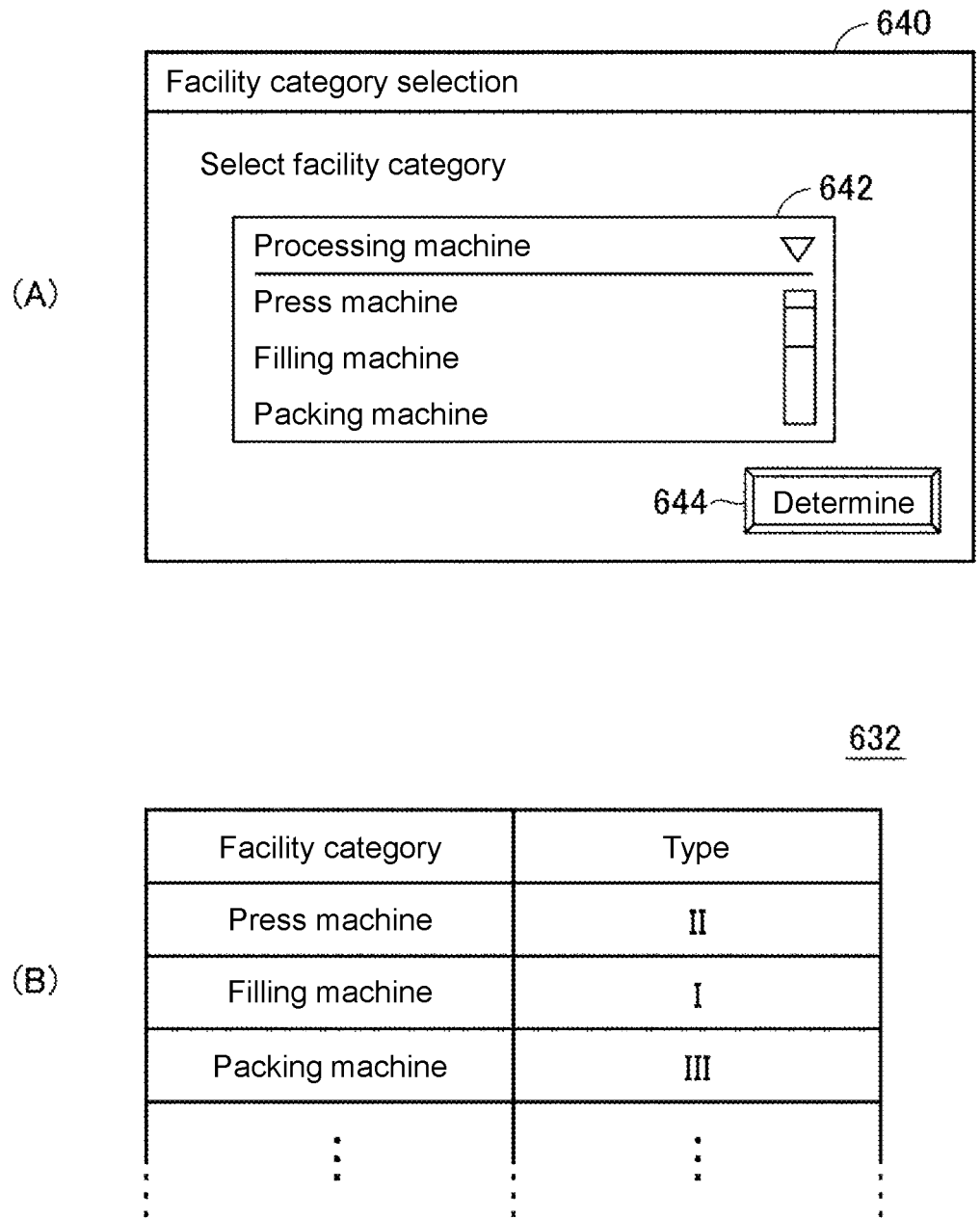
FIG. 19 is a diagram for describing a process procedure for setting a control operation in the controller system according to the present embodiment.

First, the method of selecting a target facility category will be described. FIG. 19 is a diagram for describing a process procedure for setting a control operation in the controller system according to the present embodiment.

For example, the support device 600 provides a user interface screen 640 as illustrated in (A) of FIG. 19. The user interface screen 640 includes a list 642 of selectable facility categories, and, when a user selects any facility category and then selects a determination button 644, a corresponding model setting is set.

The support device 600 has a correspondence table 632 as illustrated in (B) of FIG. 19, and, when the user selects any facility category, a corresponding type is determined. The model settings 630 (refer to FIG. 18) are referred to, and a control operation corresponding to the determined type is set.

As described above, each of the plurality of model settings 630 is associated with a facility category. The support device 600 selects and reflects a corresponding model setting in accordance with the user's selection of a facility. The method of selecting a target facility category as illustrated in FIG. 19 is used, and thus a user without expertise can set an optimal control operation in accordance with an incident characteristic.

Next, an interactive selection method will be described.

Figure 20:
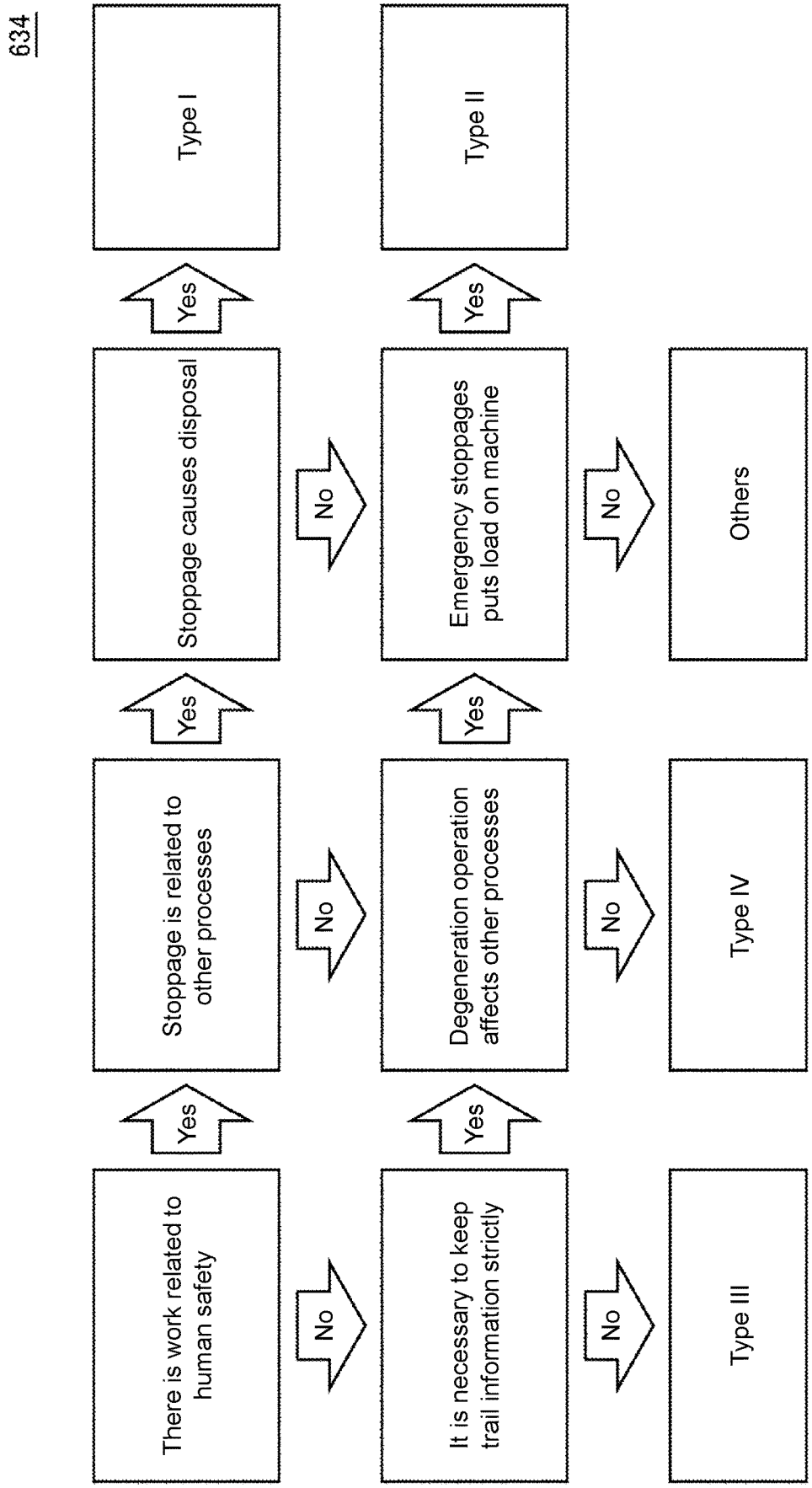
FIG. 20 is a diagram for describing another process procedure for setting a control operation in the controller system according to the present embodiment.

FIG. 20 is a diagram for describing another process procedure for setting a control operation in the controller system according to the present embodiment. With reference to FIG. 20, the support device 600 has a determination model 634 for determining a type. The determination model 634 includes one or a plurality of question items for determining characteristics, specifications, or the like of a target facility.

The support device 600 provides a question according to the determination model 634 to the user, and causes states to sequentially transition according to an answer to the question from the user. When any type is reached, the support device 600 determines a control operation corresponding to the reached type.

FIG. 21 is a diagram for describing still another process procedure for setting a control operation in the controller system according to the present embodiment. With reference to (A) of FIG. 21, the support device 600 has a question item group 636 for determining a type. The question item group 636 includes one or a plurality of question items for determining characteristics, specifications, or the like of a target facility.

The support device 600 provides the user with one or a plurality of questions included in the question item group 636, and receives answers to the questions from the user. The support device 600 determines a corresponding type by referring to a correspondence table 638 as illustrated in (B) of FIG. 21 on the basis of the answers to all questions. The support device 600 refers to the model settings 630 (refer to FIG. 18), and sets a control operation corresponding to the determined type.

As described above, the support device 600 presents one or a plurality of questions to the user via the interactive interface, and selects and reflects the model setting 630 that is a target among the plurality of model settings 630 in accordance with the user's selection for each question. The interactive form such as provision of a question and reception of an answer to the question is used, and thus even a user without expertise can set an optimal control operation in accordance with an incident characteristic.

The user may freely change the control operation determined according to the above-described procedure.

FIG. 22 is a schematic diagram illustrating an example of a user interface screen for changing settings of a control operation in the controller system according to the present embodiment. A list of details of a currently set control operation is displayed on a user interface screen 646 illustrated in FIG. 22. When the user selects any item, a sub-window 648 is displayed in correlation with the selected item. A plurality of selectable setting values is displayed in the sub-window 648, and the user selects a desired setting value. The user can perform any desired change on a model setting through such a change operation.

I. Command for Security Unit 200

As described above, when unauthorized intrusion is detected, the security unit 200 notifies the control unit 100 and the safety unit 300 of an incident characteristic corresponding to the detected unauthorized intrusion. The control unit 100 and/or the safety unit 300 may change a control operation as appropriate in accordance with the incident characteristic from the security unit 200.

As shown in the countermeasure cycle against security threats in FIG. 6, when the countermeasures are completed after the security threat primary response is executed or after the incident response is executed, the use is resumed after a trial operation. In order to perform recovery to a normal operation, it is necessary to give a command for the recovery from the control unit 100 or the safety unit 300 to the security unit 200.

There is also a need to change a security monitoring level or an activated security function of the security unit 200 in control calculation executed by the control unit 100 or the safety unit 300. For example, it may be necessary to perform a process of increasing a security monitoring level in the own controller system 1 by receiving a notification that unauthorized intrusion has been detected in another controller system 1 or a process of lowering the security monitoring level in a case where the control unit 100 is remotely maintained.

Therefore, in the controller system 1 according to the present embodiment, a command for changing an operation state may be transmitted to the security unit 200 from the control unit 100 or the safety unit 300.

Figure 23:
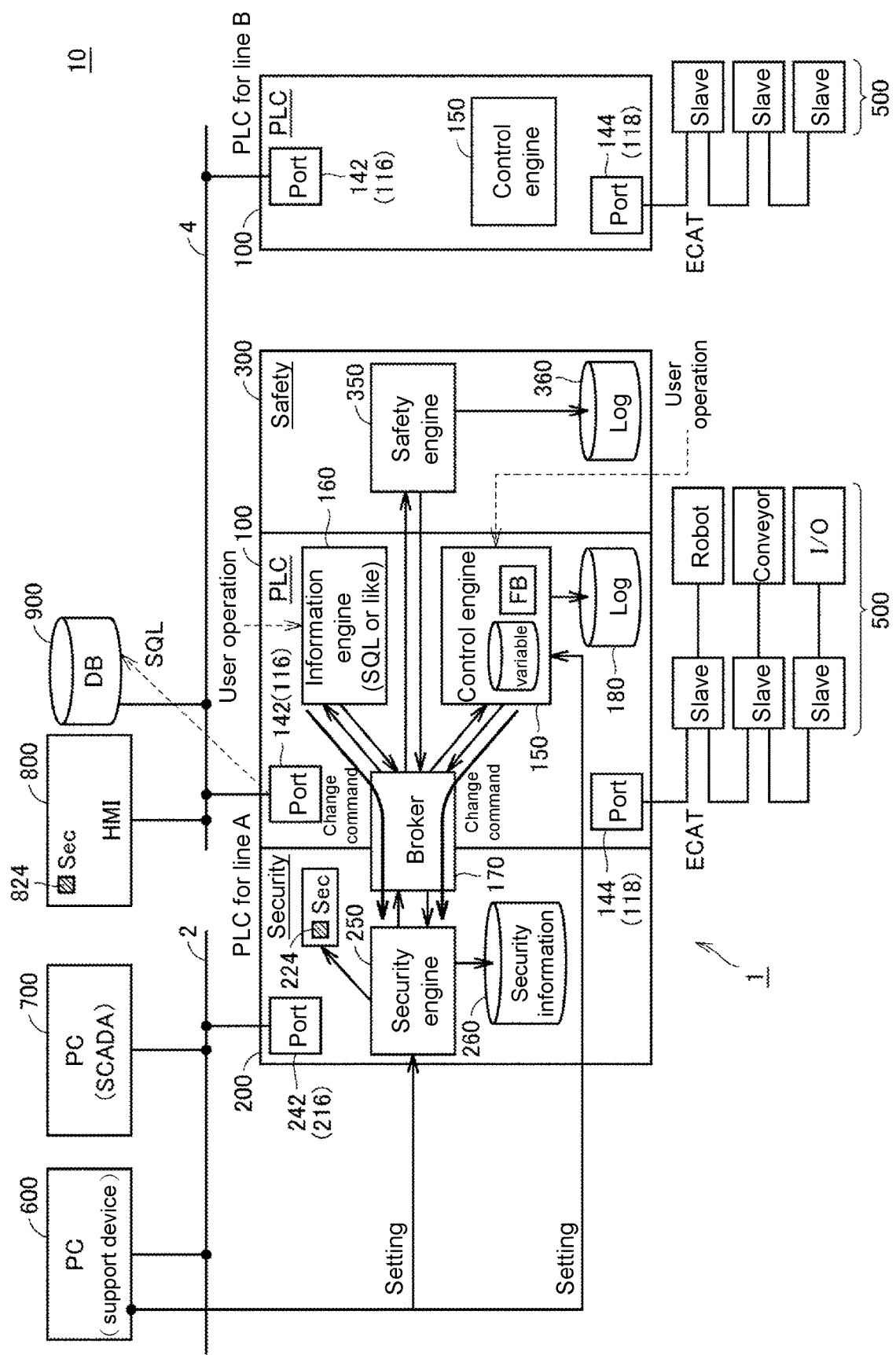
FIG. 23 is a schematic diagram for describing the exchange of change commands for the security unit of the controller system according to the present embodiment.

FIG. 23 is a schematic diagram for describing the exchange of change commands for the security unit 200 of the controller system 1 according to the present embodiment. With reference to FIG. 23, for example, the control engine 150 and the information engine 160 of the control unit 100 may output various change commands to the security engine 250 of the security unit 200 by receiving user operations or the like.

As described above, the control engine 150 and the information engine 160 of the control unit 100 corresponds to a command transmission means for transmitting commands for changing a behavior of the security engine 250 (detection means) of the security unit 200. As described above, the commands for changing a behavior of the security engine 250 of the security unit 200 may include a command for recovering detection of unauthorized intrusion in the security engine 250, and may include a command for changing a level at which the security engine 250 detects whether or not unauthorized intrusion has occurred.

The control engine 150 and the information engine 160 of the control unit 100 may transmit the commands for changing a behavior of the security engine 250 of the security unit 200 in response to a user operation, and may automatically transmit the commands when a predefined condition is established.

Figure 24:
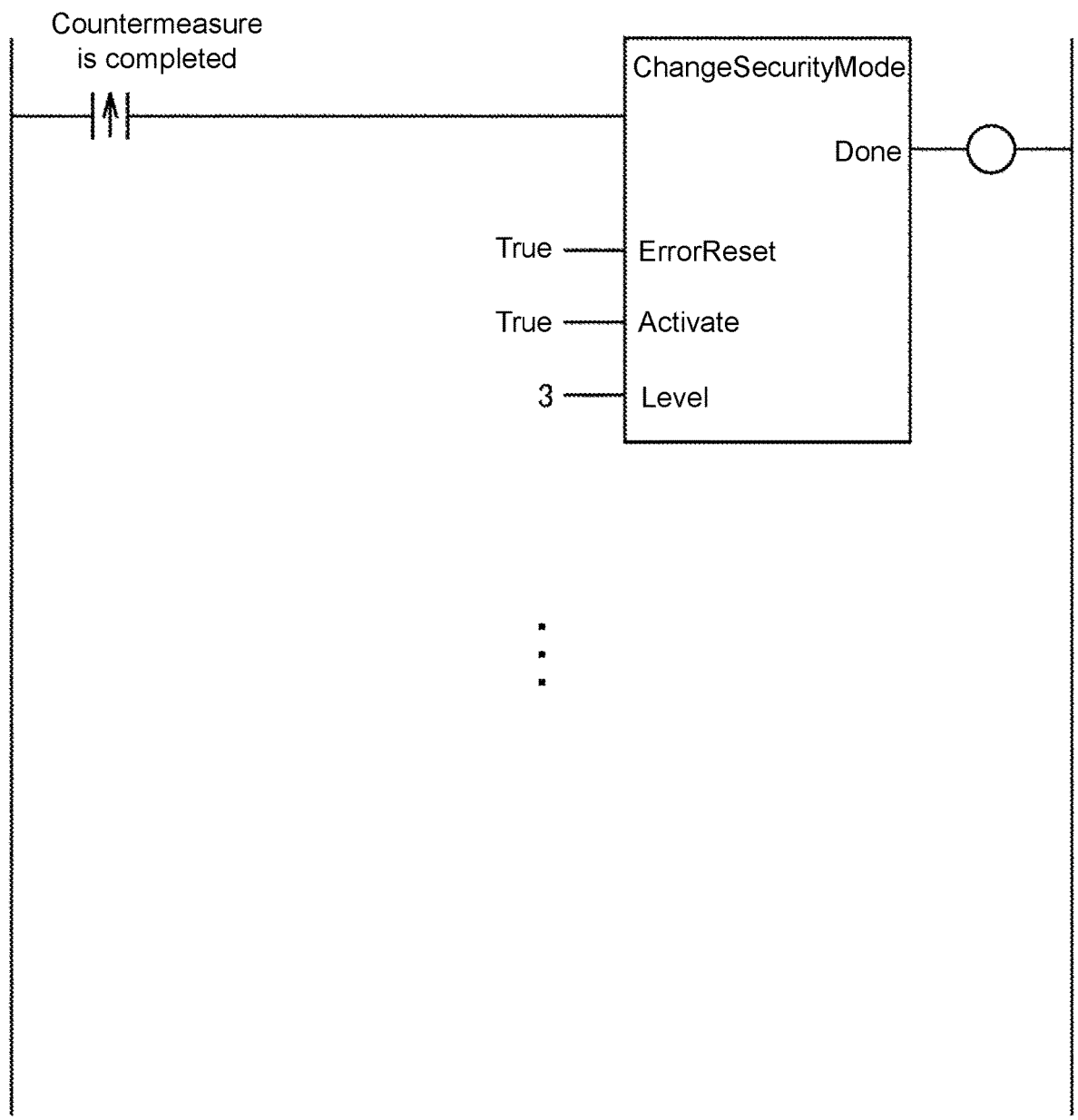
FIG. 24 is a diagram illustrating an example of a program instruction for changing an operation of the security unit of the controller system according to the present embodiment.

FIG. 24 is a diagram illustrating an example of a program instruction for changing an operation of the security unit 200 of the controller system 1 according to the present embodiment. With reference to FIG. 24, for example, a user program executed by the control unit 100 may include an instruction 190 for changing an operation of the security unit 200. In the example illustrated in FIG. 24, the instruction 190 is written in the form of a function block, but may be written in any language or form (for example, any language defined in IEC 61131-3).

As described above, the user program including the instruction related to control calculation executed by the control unit 100 may include an instruction for transmitting a command for changing a behavior of the security engine 250 (detection means). Instructions available in the user program as illustrated in FIG. 24 are prepared, and thus the security function can be flexibly used according to a control target or an operation state thereof.

The instructions for changing an operation of the security unit 200 may include, for example, (1) a command for changing, deleting, or adding an attack type (incident characteristic) of a detection target, (2) a command for activating/inactivating unauthorized intrusion detection, (3) a command for changing unauthorized intrusion detection level, and (4) a command for changing, deleting, or adding a notification destination of an incident characteristic. These are only examples, and any instruction for changing an operation of the security unit 200 may be used.

Only a command for increasing a security level may be activated in order to prevent the security unit 200 from being inactivated due to an unauthorized instruction being issued to the security unit 200.

Alternatively, the control unit 100 or the safety unit 300 issuing an instruction to the security unit 200 may be authenticated in advance according to a well-known method or may be authenticated every time.

As described above, a mechanism for instructing the security unit 200 to change an operation thereof from the control unit 100 or the safety unit 300 is employed, and thus the controller system 1 can realize flexible production while maintaining an appropriate security level as a whole.

J. Visualization of Security Information and User Support

Since a security event is usually invisible, particularly, it is difficult for a worker of an OT department to know the current status thereof. Therefore, the controller system 1 according to the present embodiment visualizes security information and also provides user support when unauthorized intrusion is detected.
(j1: Status)

In a case where the security unit 200 detects any unauthorized intrusion, a user may be notified of the unauthorized intrusion by using the indicator 224 disposed on the surface of the security unit 200, the indicator 124 disposed on the surface of the control unit 100, and the indicator 824 (refer to FIG. 5 with respect to all of the indicators) of the HMI 800. In this case, any changes in display aspects such as lighting color change, lighting start, and blinking start may be used before and after the detection of the unauthorized intrusion. Not only the display but also a sound or a voice message may be used.

A security threat may also be quantified according to a security risk. In the present specification, the "security risk" is a term that quantitatively indicates the probability or degree of detection as unauthorized intrusion. The "security risk" may be calculated, for example, by using the frequency of arrival of packets for random alteration, the degree of DDoS attack, or the like. In a case where such a quantified security risk is obtained, the calculated degree may be displayed with the indicator 124 disposed on the surface of the control unit 100 and the indicator 824 of the HMI 800.

Figure 25:
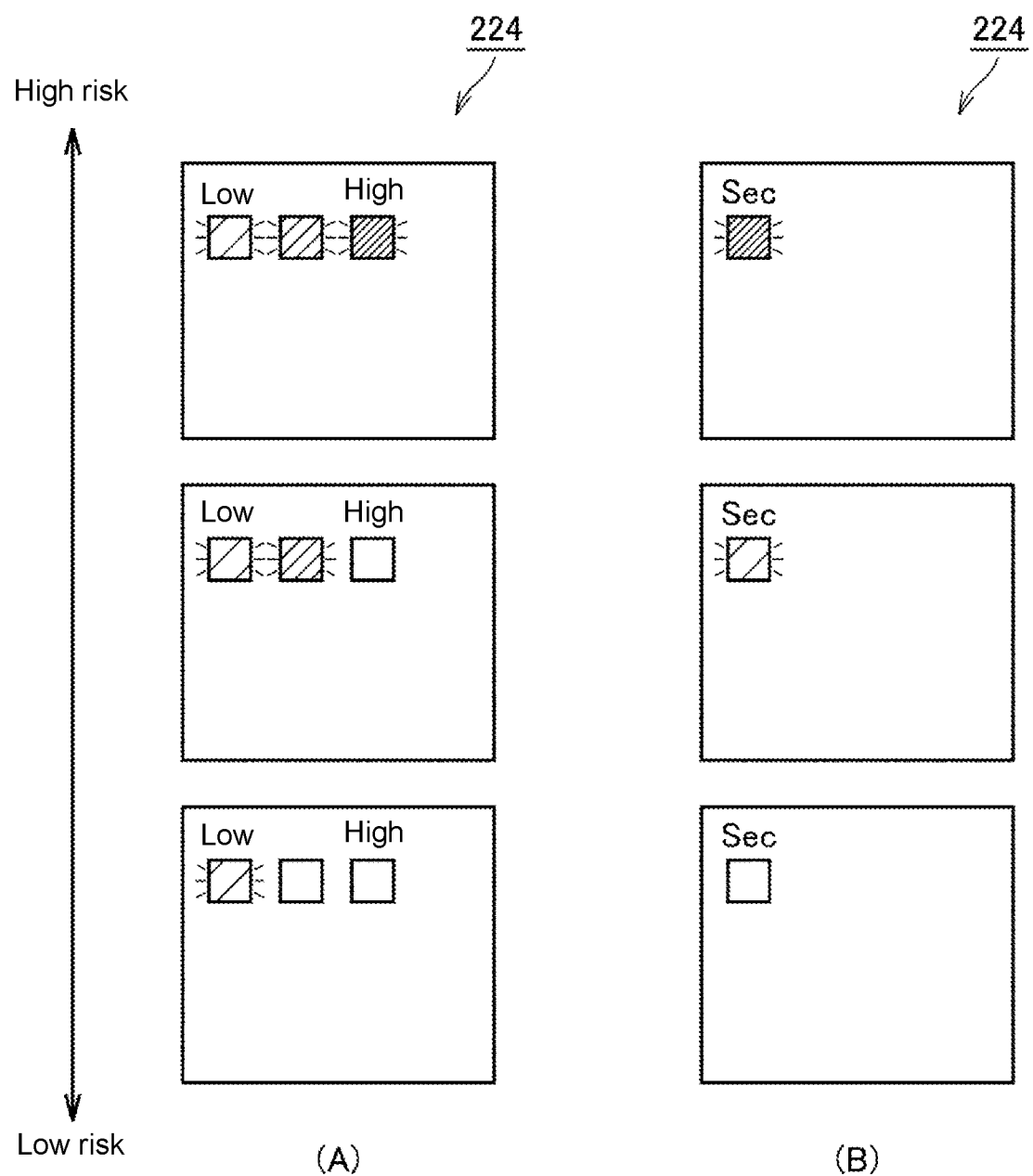
FIG. 25 is a schematic diagram illustrating an example of an indicator employed in the controller system according to the present embodiment.

FIG. 25 is a schematic diagram illustrating an example of an indicator employed in the controller system according to the present embodiment. (A) of FIG. 25 and (B) of FIG. 25 illustrate configuration examples in a case where a quantified security risk is displayed.

In the indicator 224 illustrated in (A) of FIG. 25, three light emitting diodes (LEDs) are disposed, the number of lighted LEDs or a lighting position is changed depending on a calculated security risk. In the indicator 224 illustrated in (B) of FIG. 25, a single LED is disposed, and a lighting color or a lighting intensity is changed depending on a calculated security risk.

As described above, the security unit 200 has the indicator 224 that is an example of a presentation means for visually presenting, to a user, a security risk that is calculated on the basis of a detection operation of the security engine 250 that is a detection means.

The above-described indicator 224 is disposed, and thus even a worker without expertise can easily understand the current status of a security risk.

An indicator is not limited to the indicator as illustrated in FIG. 25, and any indicator may be used as long as a security risk can be presented.

A user may be notified by using a sound, a voice message, or the like.

Figure 26:
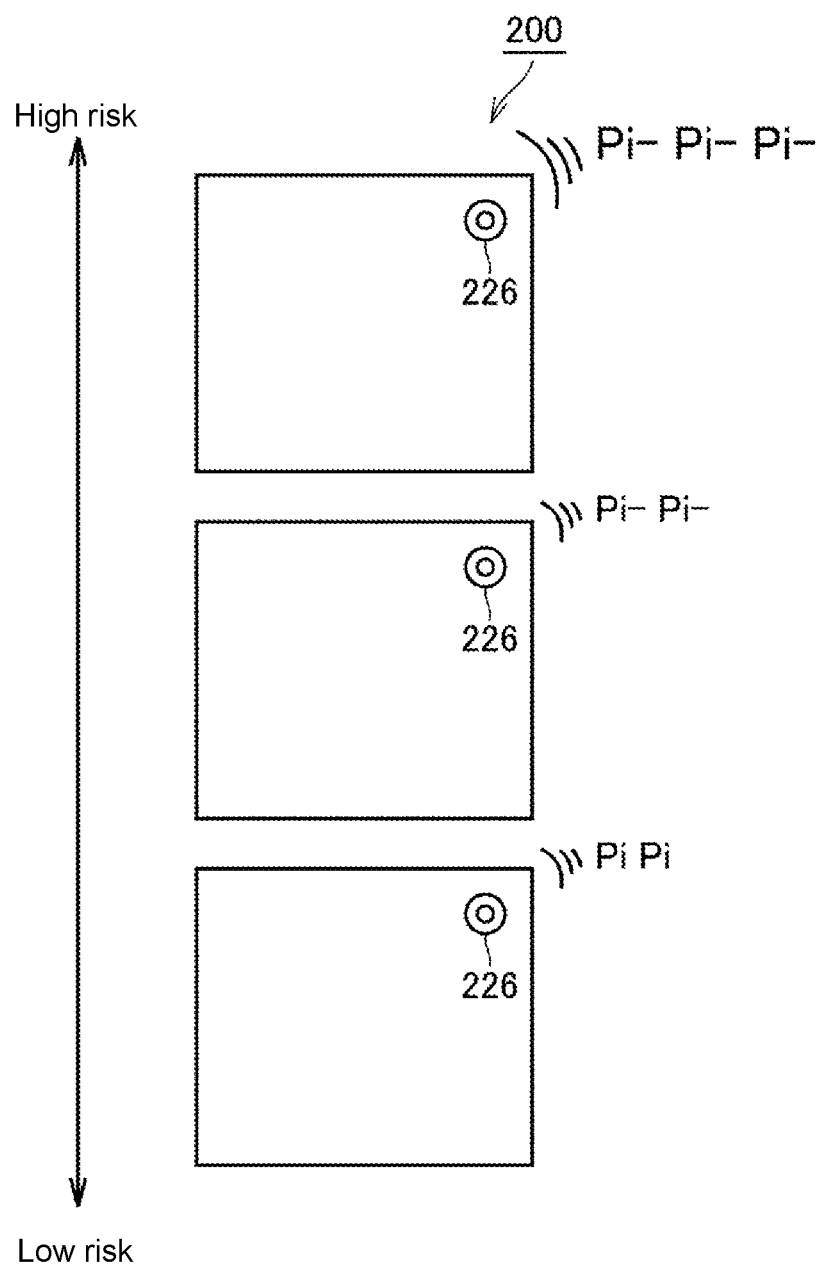
FIG. 26 is a schematic diagram illustrating an operation example of a speaker employed in the controller system according to the present embodiment.

FIG. 26 is a schematic diagram illustrating an operation example of a speaker employed in the controller system according to the present embodiment. In the example illustrated in FIG. 26, voice or a voice message is output from the speaker 226 of the security unit 200 according to a security risk.

For example, as a security risk becomes higher, a volume of output voice may be increased, and an interval of voice generation may be reduced. As a security risk becomes higher, a principal component of the frequency may become higher. A tone may be changed depending on a security risk.

In a case where a voice message is output from the speaker 226, a content or a volume of the voice message may be changed depending on a security risk. For example, a content of a message may be different, such as "a minor security risk has been detected", "the security risk is increasing", or "a serious security threat has occurred" depending on a magnitude of a security risk.

As described above, the security unit 200 has the speaker 226 (voice generation part) that is an example of a presentation means for aurally presenting, to a user, a security risk calculated on the basis of a detection operation of the security engine 250 that is a detection means.

The above-described speaker 226 is disposed, and thus even a worker without expertise can easily understand the current status of a security risk.

As illustrated in FIG. 25 and FIG. 26, the presentation means such as the indicator 224 or the speaker 226 may change a presentation aspect according to the degree of calculated security risk. A user can promptly recognize the current security risk on the basis of such a change of a presentation aspect.

(j2: Log)

An unauthorized intrusion detection result in the security unit 200 may be stored as the security information 260 of the security unit 200 (refer to FIG. 5 and the like). A necessary log may be stored as appropriate in a database disposed inside the controller system 1 or outside the controller system 1.

(j3: Alarm History)

In the same manner as in the above-described log, for example, in a case where the security unit 200 detects unauthorized intrusion and issues an alarm, the alarm history may be stored as the security information 260 of the security unit 200 (refer to FIG. 5 and the like). A necessary alarm history may be stored as appropriate in a database disposed inside the controller system 1 or outside the controller system 1.

(j4: Troubleshooting)

As illustrated in FIG. 6, when unauthorized intrusion is detected and the security threat primary response is executed (step S4), the worker of the OT department performs a necessary process on the control target facility or machine (site response) (step S5). For the purpose of supporting work of the worker of the OT department, troubleshooting information may be presented on the HMI 800 or the like in accordance with the type of detected unauthorized intrusion and details of the executed security threat primary response.

Such troubleshooting information is presented, and thus the time required to resume the use in a normal operation can be reduced.

K. Modification Examples

In the above-described embodiment, the controller system 1 in which the control unit 100, the security unit 200, and the safety unit 300 are configured as independent units has been described. Flexibility or availability can be increased by configuring the units as independent units.

However, each function is not necessarily required to be configured as an independent unit, and all or some of the control unit 100, the security unit 200, and the safety unit 300 may be configured as a common unit. In this case, there is an advantage that a casing can be made compact.

Figure 27:
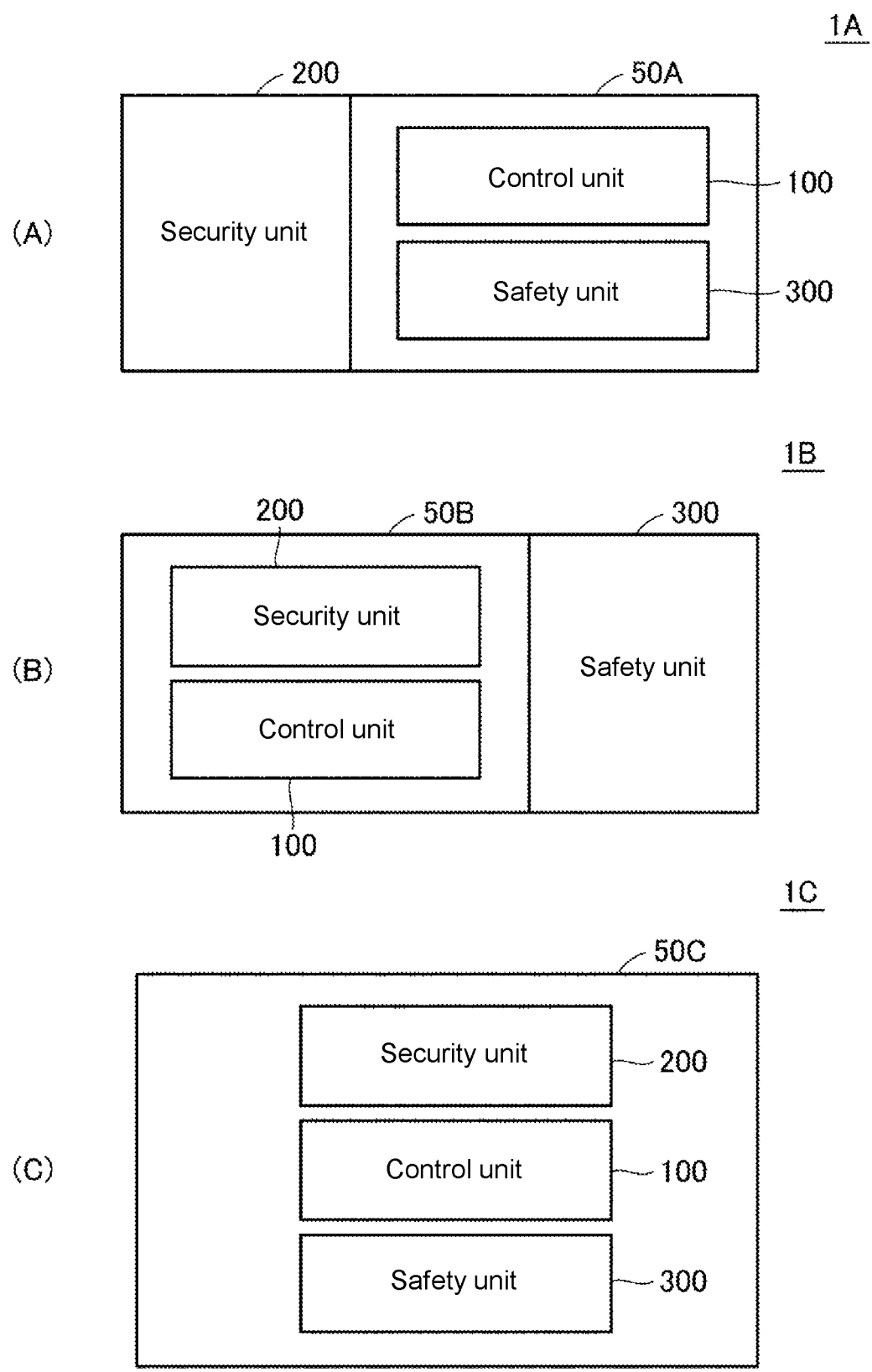
FIG. 27 is a schematic diagram illustrating a modification example of the configuration of the controller system according to the present embodiment.

FIG. 27 is a schematic diagram illustrating a modification example of the configuration of the controller system 1 according to the present embodiment. FIG. 27 illustrates configuration examples in which all or some of the control unit 100, the security unit 200, and the safety unit 300 are integrated with each other.

A controller system 1A illustrated in (A) of FIG. 27 includes an integrated unit 50A into which the control unit 100 and the safety unit 300 are integrated and the security unit 200. In other words, in the integrated unit 50A of the controller system 1A, the standard control and the safety control are executed in the same unit.

A controller system 1B illustrated in (B) of FIG. 27 includes an integrated unit 50B into which the security unit 200 and the control unit 100 are integrated and the safety unit 300. In other words, in the integrated unit 50B of the controller system 1B, a communication process with other devices and the standard control are executed in the same unit.

A controller system 1C illustrated in (C) of FIG. 27 includes an integrated unit 50C into which the control unit 100, the security unit 200, and the safety unit 300 are integrated. In other words, in the integrated unit 50C of the controller system 1C, a communication process with other devices, the standard control, and the safety control are executed in the same unit.

As described above, any installation forms of the functions and the processes of which the control unit 100, the security unit 200, and the safety unit 300 are in charge may be used. Some of the functions of which the control unit 100, the security unit 200, and the safety unit 300 are in charge may be installed in a common processing unit.

L. Appendix

The present embodiment described above includes the following technical concept.

[Configuration 1]

A controller system (1) including:
  a control unit (100) that executes control calculation for controlling a control target; and
  a security unit (200) that is connected to the control unit and oversees and manages security functions for the controller system,
  in which the security unit includes a detection means (250) for detecting whether or not any unauthorized intrusion into the controller system has occurred, and in which the control unit includes a command transmission means (150, 160) for transmitting commands for changing a behavior of the detection means of the security unit.

[Configuration 2]

The controller system according to Configuration 1,
  in which the commands for changing the behavior of the detection means include a command for recovering detection of the unauthorized intrusion in the detection means.

[Configuration 3]

The controller system according to Configuration 1 or 2,
  in which the commands for changing the behavior of the detection means include a command for changing a level at which the detection means detects whether or not the unauthorized intrusion has occurred.

[Configuration 4]

The controller system according to any one of Configurations 1 to 3,
  in which the command transmission means transmits the commands for changing the behavior of the detection means in response to a user operation.

[Configuration 5]

The controller system according to any one of Configurations 1 to 4,
  in which the control unit is configured to execute a user program including instructions related to the control calculation, and
  in which the user program includes an instruction for transmitting the commands for changing the behavior of the detection means.

[Configuration 6]

A controller system (1) including:
  a control unit (100) that executes control calculation for controlling a control target;
  a security unit (200) that is connected to the control unit and oversees and manages security functions for the controller system; and
  a support device (600) capable of accessing at least the control unit,
  in which the security unit includes a detection means (250) for detecting whether or not any unauthorized intrusion into the controller system has occurred, in which the control unit is configured to execute control calculation in accordance with the unauthorized intrusion detected by the detection means, and in which the support device receives a setting related to the control calculation executed by the control unit in accordance with the unauthorized intrusion detected by the detection means.

[Configuration 7]

The controller system according to Configuration 6, in which the support device receives designation of a program to be executed by the control unit when the unauthorized intrusion is detected by the detection means.

[Configuration 8]

The controller system according to Configuration 7, in which the support device receives designation of a type of unauthorized intrusion as a condition on which the program is executed by the control unit.

[Configuration 9]

The controller system according to any one of Configurations 6 to 8, in which the support device has a plurality of model settings (630) defining typical behaviors of a control operation, and reflects any of the plurality of model settings in the control unit in response to a user operation.

[Configuration 10]

The controller system according to Configuration 9, in which each of the plurality of model settings is associated with each facility category, and in which the support device selects and reflects a corresponding model setting in accordance with a user's selection of a facility.

[Configuration 11]

The controller system according to Configuration 9, in which the support device presents one or a plurality of questions to a user via an interactive interface (634, 636), and selects and reflects a target model setting among the plurality of model settings in accordance with the user's selection for each question.

[Configuration 12]

A controller system (1) including:

a control unit (100) that executes control calculation for controlling a control target; and a security unit (200) that is connected to the control unit and oversees and manages security functions for the controller system, in which the security unit includes a detection means (250) for detecting whether or not any unauthorized intrusion into the controller system has occurred, and a presentation means (250) for presenting, to a user, a security risk calculated on the basis of a detection operation of the detection means.

[Configuration 13]

The controller system according to Configuration 12, in which the presentation means includes an indicator (224) for visually presenting the security risk.

[Configuration 14]

The controller system according to Configuration 12 or 13, in which the presentation means includes a voice generation part (226) for aurally presenting the security risk.

[Configuration 15]

The controller system according to any one of Configurations 12 to 14, in which the presentation means changes a presentation aspect depending on a degree of the calculated security risk.

It should be considered that the embodiments disclosed this time are exemplary in all respects and not limited. The scope of the present invention is shown by the claims, not the above description, and is intended to include all modifications within the meaning and the scope equivalent to the claims.

What is claimed is:

1. A controller system comprising:

a control unit that executes control calculation for controlling a control target;

a security unit that is connected to the control unit and oversees and manages security functions for the controller system; and a support device capable of accessing at least the control unit, wherein the security unit comprises a detection means for detecting whether or not any unauthorized intrusion into the controller system has occurred, wherein the control unit comprises a command transmission means for transmitting commands for changing a behavior of the detection means of the security unit in response to a detection of the unauthorized intrusion into the controller system, in response to the detection of the unauthorized intrusion into the controller system, the control unit executes a primary response which includes a continuation response, a degeneration response, or a stoppage response, and when the primary response is executed and an incident occurs, the control unit executes an incident response according to an incident characteristic of the incident, wherein the support device has a plurality of model settings defining typical behaviors of a control operation, and reflects any of the plurality of model settings in the control unit in response to a user operation, each of the plurality of model settings is associated with a facility category, and the support device selects and reflects a corresponding model setting in accordance with a user's selection of a facility.

2. The controller system according to claim 1, wherein the commands for changing the behavior of the detection means comprise a command for recovering detection of the unauthorized intrusion in the detection means.

3. The controller system according to claim 1, wherein the commands for changing the behavior of the detection means comprise a command for changing a level at which the detection means detects whether or not the unauthorized intrusion has occurred.

4. The controller system according to claim 1, wherein the command transmission means transmits the commands for changing the behavior of the detection means in response to a user operation.

5. The controller system according to claim 1, wherein the control unit is configured to execute a user program comprising instructions related to the control calculation, and wherein the user program comprises an instruction for transmitting the commands for changing the behavior of the detection means.

6. The controller system according to claim 1, wherein the security unit further comprises a presentation means for presenting, to a user, a security risk calculated on the basis of a detection operation of the detection means.

7. The controller system according to claim 1, wherein the incident characteristic includes a type of the detected unauthorized intrusion, and the type of the detected unauthorized intrusion comprises at least one of a random alteration, a resource exhaustion, and a DDOS attack.

8. The controller system according to claim 1, wherein the incident characteristic comprises an urgency level of detected unauthorized intrusion.

9. A controller system comprising:
a control unit that executes control calculation for controlling a control target;
a security unit that is connected to the control unit and oversees and manages security functions for the controller system; and
a support device capable of accessing at least the control unit,
wherein the security unit comprises a detection means for detecting whether or not any unauthorized intrusion into the controller system has occurred,
wherein the control unit is configured to execute control calculation in response to a detection of the unauthorized intrusion by the detection means,
wherein the support device receives a setting related to the control calculation executed by the control unit in response to the detection of the unauthorized intrusion by the detection means,
in response to the detection of the unauthorized intrusion into the controller system, the control unit executes a primary response which includes a continuation response, a degeneration response, or a stoppage response, and
when the primary response is executed and an incident occurs, the control unit executes an incident response according to an incident characteristic of the incident,
wherein the support device has a plurality of model settings defining typical behaviors of a control operation, and reflects any of the plurality of model settings in the control unit in response to a user operation, each of the plurality of model settings is associated with a facility category, and the support device selects and reflects a corresponding model setting in accordance with a user's selection of a facility.

10. The controller system according to claim 9, wherein the support device receives designation of a program to be executed by the control unit when the unauthorized intrusion is detected by the detection means.

11. The controller system according to claim 10, wherein the support device receives designation of a type of unauthorized intrusion as a condition on which the program is executed by the control unit.

12. The controller system according to claim 9, wherein the support device presents one or a plurality of questions to a user via an interactive interface, and selects and reflects a target model setting among the plurality of model settings in accordance with the user's selection for each question.

13. The controller system according to claim 6, wherein the presentation means comprises an indicator for visually presenting the security risk.

14. The controller system according to claim 6, wherein the presentation means comprises a voice generation part for aurally presenting the security risk.

15. The controller system according to claim 6, wherein the presentation means changes a presentation aspect depending on a degree of the calculated security risk.

* * * * *